US006525900B2

(12) United States Patent
Hamatsu et al.

(10) Patent No.: US 6,525,900 B2
(45) Date of Patent: Feb. 25, 2003

(54) FLEXIBLE RECORDING SYSTEM, FLEXIBLE DISK DRIVE AND RECORDING DISK

(75) Inventors: Kazunobu Hamatsu, Tokyo (JP); Kenji Shoji, Tokyo (JP); Kazuya Oda, Tokyo (JP); Akira Hashimoto, Tokyo (JP); Yasutaka Mizutani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/199,466

(22) Filed: Nov. 25, 1998

(65) Prior Publication Data

US 2001/0043432 A1 Nov. 22, 2001

Related U.S. Application Data

(63) Continuation-in-part of application No. 08/791,906, filed on Jan. 31, 1997, now Pat. No. 5,959,804.

(30) Foreign Application Priority Data

Nov. 25, 1997 (JP) ............................................. 9-322849
Nov. 25, 1997 (JP) ............................................. 9-322850

(51) Int. Cl.[7] ......................... G11B 19/00; G11B 23/00; G11B 23/033
(52) U.S. Cl. ............................. 360/99.01; 360/99.05; 360/133
(58) Field of Search ........................ 360/99.01, 99.02, 360/99.03, 99.04, 99.05, 99.06, 99.07, 99.08, 99.09, 99.11, 99.12, 133; 369/291

(56) References Cited

U.S. PATENT DOCUMENTS 4,078,246 A  * 3/1978 Berthoux et al. ........... 360/133
4,445,155 A  * 4/1984 Takahashi et al. ......... 360/99.04
4,445,157 A    4/1984 Takahashi
4,602,299 A  * 7/1986 Saito ........................... 360/60

(List continued on next page.)

OTHER PUBLICATIONS

Japanese Publication No. (U) 60–127–684; Publication dated Aug. 27, 1985—Front Page with English excerpt.
Japanese Publication No. (U) 61–153–181 Publication dated Sep. 22, 1986—Front Page with English excerpt.

Primary Examiner—William Klimowicz
(74) Attorney, Agent, or Firm—Birch, Stewart, Kolasch & Birch, LLP

(57) ABSTRACT

A small-sized and thin flexible recording system including a flexible disk drive and a recording disk is provided. The recording disk has a disk-shaped recording medium and a recording medium cartridge rotatably receiving therein the recording medium. The flexible disk drive includes a magnetic head for recording information into the recording medium or reproducing information recorded in the recording medium, a carriage mechanism for moving the magnetic head, a recording medium drive motor for rotating the recording medium, a frame having an insertion opening through which the recording disk is inserted, a recording medium mounting portion formed adjacent the insertion opening in a direction in which the recording disk is inserted for mounting thereon the recording disk, and a recording-disk ejection mechanism for ejecting the recording disk from the frame. The recording disk has a write-protect instructing member which comprises a hole formed in an end face of the recording medium cartridge disposed at one side thereof from which the recording disk is inserted into the frame, and an element for opening and closing the hole. The flexible disk drive has a write-protect detector provided on the disk mounting portion at its one end from which the recording disk is inserted into the flexible disk drive for detecting permission or inhibition of writing into the recording medium based on the open or closed state of the hole.

22 Claims, 26 Drawing Sheets

U.S. PATENT DOCUMENTS

| | | | | |
|---|---|---|---|---|
| 4,641,212 A | * | 2/1987 | Yokota et al. | 360/99.07 |
| 4,658,317 A | * | 4/1987 | Lievsay, Jr. | 360/133 |
| 4,710,831 A | * | 12/1987 | Nishimura | 360/99.02 |
| 5,041,923 A | * | 8/1991 | Iwata et al. | 360/60 |
| 5,440,436 A | * | 8/1995 | Iftikar et al. | 360/133 |
| 5,850,384 A | * | 12/1998 | Ohmori et al. | 369/291 |
| 5,956,207 A | * | 9/1999 | Hashimoto et al. | 360/99.12 |
| 5,959,804 A | * | 9/1999 | Hashimoto et al. | 360/99.06 |
| 5,999,382 A | * | 12/1999 | Muse et al. | 360/133 |

* cited by examiner

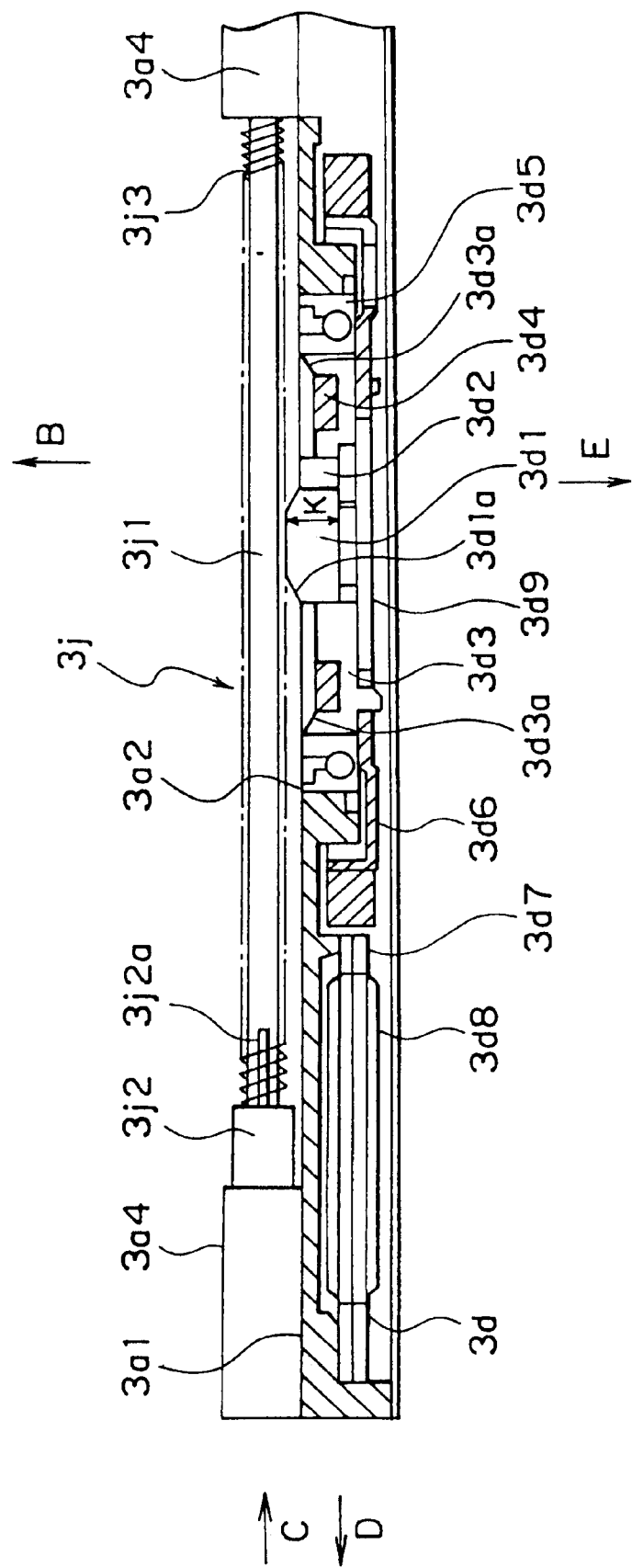

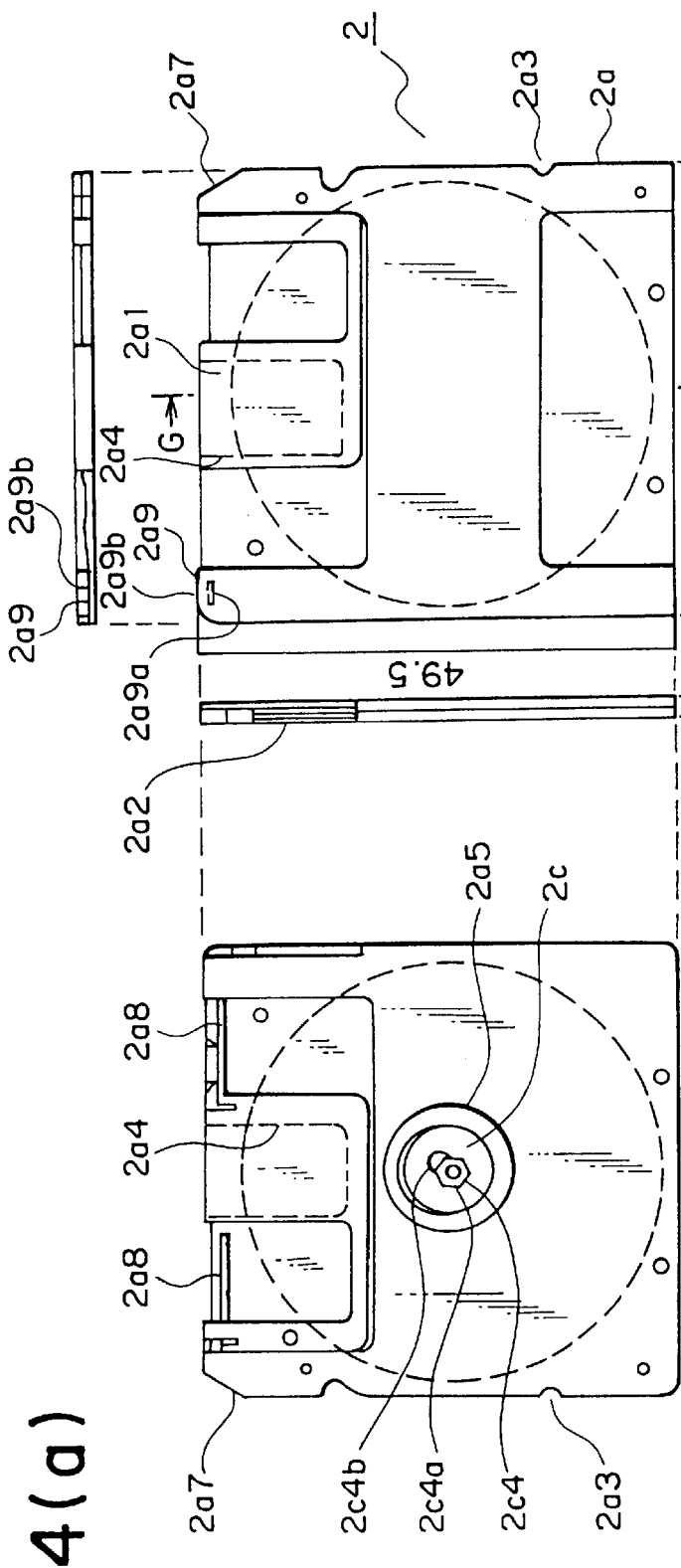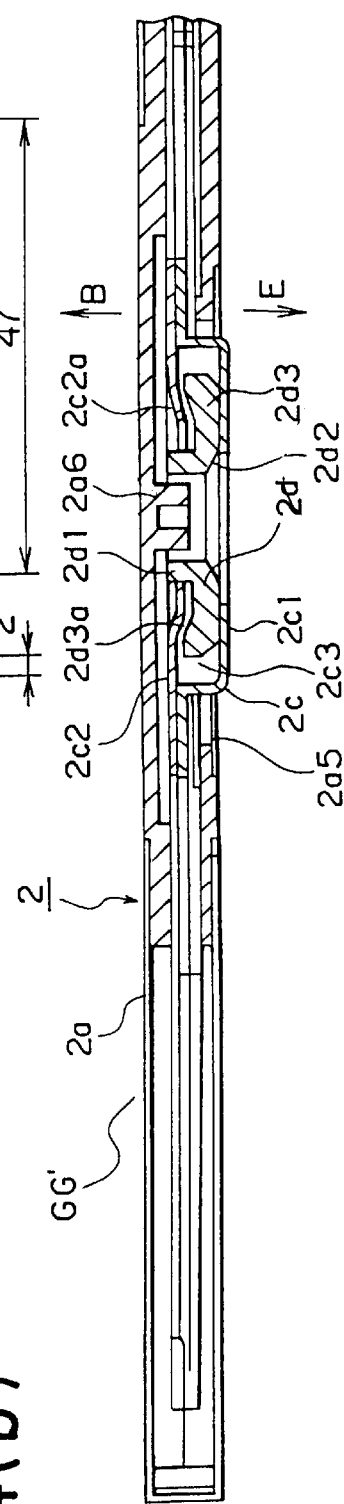
FIG. 4(a)
FIG. 4(b)

FLEXIBLE RECORDING SYSTEM, FLEXIBLE DISK DRIVE AND RECORDING DISK

This is a continuation-in-part of application Ser. No. 08/791,906 filed Jan. 31, 1997 and issued as U.S. Pat. No. 5,959,804 on Sep. 28, 1999.

BACKGROUND OF THE INVENTION

1. Field of the Invention

The present invention relates to an information recording system suitable for use with a personal computer, a portable information terminal and the like, and more particularly, to a flexible recording system in which a recording medium is exchangeable, and to a flexible disk drive and a recording disk.

2. Description of the Related Art

FIG. 24 is a fragmentarily sectional perspective view showing a conventional flexible disk drive which is disclosed in a Japanese Patent Laid-Open No. Hei 06-119699. FIG. 25 is a cross section taken along line AA' in FIG. 24.

In FIG. 24, a disk-shaped recording medium is received in and protected by a recording medium cartridge 50a. The recording medium cartridge 50a is provided with a window (not shown) and a shutter (not shown) for opening and closing the window. Also, the recording medium cartridge 50a is provided on its bottom with a write-protect hole (not shown) for preventing erasure of information recorded in the recording medium 50 and writing of new information therein, and a slide member (not shown) adapted to dose the write-protect hole for enabling information in the recording medium 50 to be erased or new information to be recorded thereinto.

The flexible disk drive 51 (hereinafter referred to as FDD) includes a read/write head 52 for recording information into the recording medium 50 and reproducing information recorded therein, and a carriage 53 for moving the read/write head 52 to a predetermined record track (not shown) of the recording medium 50 under the action of a stepping motor 55. A head arm 54 holding the read/write head 52 is coupled to and supported by the carriage 53.

The FDD 51 further has a recording medium drive motor 56 for driving the recording medium 50 to rotate, and a control board 57 for controlling the read/write head 52, the stepping motor 55 and the recording medium drive motor 56. The control board 57 has a detection switch (not shown) for detecting that the recording medium 50 has been mounted or loaded into the FDD 51, and a write-protect switch (not shown) for detecting whether writing information into the recording medium 50 is permitted.

A cartridge holder 58 for holding the recording medium 50 has a cam follower 58a and a shutter opener 58b. A slide cam 59 has a cam groove 59a which is adapted to be engaged with the cam follower 58a to cause the cartridge holder 58 to move up and down. An eject button 59b is provided on the slide cam 59. The operation of the slide cam 59 is restricted by a latch lever 60.

The above-described components 52 through 60 are housed in or mounted to a frame 61 which has a fitting part 61a for mounting an external dedicated slot 62 An upper cover or shield 63 is mounted on an upper portion of the frame 61.

As shown in FIG. 25, the recording medium 50 is fixedly secured at its center to a hub 50b which has two holes 50b1, 50b2. The cartridge 50a has a window 50c formed therethrough, a shutter 50d for opening and closing the window 50c, a write-protect hole 50e and a slide member 50f.

The recording medium drive motor 56 has a rotor 56a, a chucking portion 56b fixedly secured to the rotor 56a and having a magnetized portion contacting the hub 50b, a drive pin 56c provided on the chucking portion 56b, a rotation shaft or spindle shaft 56d fixedly attached to the chucking portion 56b, a bearing 56e for rotatably supporting the spindle shaft 56d, a stationary member in the form of a stator 56f, and a coil 56g wound around the stator 56f.

The control board 57 has a disk-in switch 57a with an operating portion 57a1 for detecting that the recording medium 50 is set at a read/write position in the FDD 51. The control board 57 also has a write protect switch 57b with an operating portion 57b1 for detecting the write protection of the recording medium 50. Here, permission of writing (recording and erasure of information are permitted) is in a state that the operating portion 57b1 at the distal end of the write-protect switch 57b is pushed into the write-protect switch 57 by means of the slide member 50f. On the other hand, write protection is in a state that the operating portion 57b1 is not pushed in by the slide member 50f.

The disk-in switch 57a is of the same or like configuration as the write-protect switch 57b. When the recording medium 50 is mounted in the FDD 51, the operating portion 57a1 of the disk-in switch 57a is pushed into the disk-in switch 57a by means of the recording medium cartridge 50a. On the contrary, when the recording medium 50 is not mounted in the FDD) 51, the operating portion 57a1 is not pushed in.

The operation of the conventional flexible disk drive will be explained while referring to FIGS. 24 and 25.

At first, a transition from the unloaded state where it is not possible to read from and write on the recording medium 50 to the loaded state where it is possible to read from and write on the recording medium 50 is explained below.

When the recording medium 50 is not inserted into the FDD 51, the cam follower 58a of the cartridge holder 58 is pushed up by the cam groove 59a of the slide cam 59, so the cartridge holder 58 is positioned above the spindle shaft 56d of the recording medium drive motor 56, i.e., at the side B.

Then, the recording medium cartridge 50a is further moved in a direction C in FIG. 24 so as to be inserted into the cartridge holder 58, the shutter 50d is opened by the shutter opener 58b, so that the read/write head 52 can reproduce information from the recording medium 50. At this time, the distal end of the recording medium 50 comes in contact with the latch lever 60, thus causing it to rotate.

Owing to the rotation of the latch lever 60, the slide cam 59 is released from restriction of the latch lever 60, and forced to move in a direction D under the biasing force of an unillustrated spring. Since the cam groove 59a in the slide cam 59 is in engagement with the cam follower 58a of the cartridge holder 58, te cartridge holder 58 is displaced in a direction E in accordance with the movement of the cam groove 59a in the slide cam 59, while holding the recording medium 50.

When the recording medium 50 is lowered to a predetermined location with the movement of the cartridge holder 58 in the direction E, the hole 50b2 in the hub 50b holding the recording medium 50 is engaged with the spindle shaft 56d, whereby the drive pin 56c is fitted into the hole 51b1 and the hub 50b is magnetically attracted by the chucking portion 56b, thus making it possible for the recording medium 50 to be rotated by means of the recording medium drive motor 56.

On the other hand, in accordance with the movement of the recording medium 50 in the direction E, the operating portion 57a1 of the disk-in switch 57a is pushed into the disk-in switch 57a by means of the recording medium cartridge 50a, so that the control board 57 generates a signal indicative of the loading or mounting of the recording medium 50 to an unillustrated external device. Similarly, the control board 57 generating a signal indicative of write protection or permission to the unillustrated external device, depending upon whether the operating portion 57b1 of the write-protect switch 57b is pushed into the write-protect switch 57b.

Thereafter, the read/write head 52 supported by the carriage 53 can contact the recording surface of the recording medium 50 through the window 50c for reproducing information therefrom.

Next, a transition from the loaded state to the unloaded state of the recording medium 50 will be explained.

By pressing the eject button 59b to a fixed position in the direction C, the slide cam 59 is moved similarly, so the cartridge holder 58 is moved or raised in the direction B along the cam groove 59a. When the hub 50b of the recording medium 50, moving with the cartridge holder 58, comes to a position to the direction B from the drive pin 56c and the spindle shaft 56d, the respective engagements between the hole 51b1, 50b2 and the drive pin 56c and the spindle shaft 56d are released, and hence the engagement between the shutter 50d and the shutter opener 58b is also released, thus closing the shutter 50d.

As a result, the recording medium 50 is moved in the direction D by the shutter opener 58b and the latch lever 60 which are both biased by unillustrated springs, so that it is ejected from the cartridge holder 58.

In addition, the slide cam 59 is latched by the latch lever 60 and restricted in its movement, and the cartridge holder 58 is held at a position to the direction B from the spindle shaft 56d through engagement between the cam follower 58a and the cam groove 59a in the slide cam 59.

FIGS. 26 through 29 illustrate another conventional flexible recording system which is disclosed, for example, in Japanese Patent Application No. Hei 7-302979 (1995-302979). FIG. 26 is a perspective view showing an overall construction thereof; FIG. 27 is a cross-sectional side view showing the system with a recording disk mounted thereon, being sectioned by a center line thereof; FIG. 28 is a partially broken plan view of the same; and FIG. 29 is a cross section taken along line BB' of FIG. 28.

In FIG. 26, a disk-shaped recording medium 70 is received in a cartridge 70a, and is fixedly attached to a hub 70b. The cartridge 70a has a window (not shown) which is opened or closed by a shutter 70c. The recording medium 70 is mounted into a flexible disk drive 71 (hereinafter simply referred to as FDD) so that information is recorded into or reproduced from the recording medium 70 by means of the FDD 71. A flexible recording system, generally designated at 90, comprises the recording medium 70 and the flexible disk drive device 71. The system 90 is provided with a general-purpose slot 91 of a PCMCIA (Personal Computer Memory Card Association) type 2 standard which is adapted to be mounted on an information processing device (not shown) such as a portable information peripheral terminal and the like. The slot 91 comprises a mounting portion 91a for mounting therein the FDD 71 and an eject button 91b for ejecting or discharging the FDD 71 therefrom.

In FIG. 27, a limiting or restrictive member 70a1 is provided on the cartridge 70a for rotatably supporting the hub 70b and limiting or suppressing movements or displacements thereof. The hub 70b is positioned at the center of the recording medium 70 and fixedly secured thereto. The hub 70b has a hole or aperture 70b1 formed therethrough, three protrusions or convexities 70b2 disposed around the center of the hole 70b1 at equal circumferential intervals (i.e., spaced an angle of 120 degrees from each other), and a window or opening 70d formed therein which is opened or closed by the shutter 70c.

Also, a read/write head 72 is provided for recording information into the recording medium 70 or reproducing information recorded thereon. A cartridge 73 is driven to move the read/write head 72 to a predetermined recording track (not shown) under the action of a stepping drive motor 75 (see FIG. 28). A head arm 74 is supported at its one end by the carriage 73.

A recording medium drive motor 76 serves to rotate the recording medium 70 and has a rotating member in the form of a rotor 76a and a chucking portion 76b which acts to fix the rotor 76a. A part of the chucking portion 76b that is in contact with the hub 70b is magnetized to attract and hold the hub 70b in position through a magnetic force. The chucking portion 76b is provided with concavities 76c into which the convexities 70b2 are engaged. The recording medium drive motor 76 has a rotation shaft 76d which is formed into a spherical shape and movable in a direction indicated at B or E. The rotation shaft 76d is rotatably supported by bearings 76e. The recording medium drive motor 76 further comprises a stationary member in the form of a stator 76f, a coil 76g wound around the stator 76f, and a spring 76h for urging the rotation shaft 76d toward the direction or side B.

In FIG. 28, the recording medium cartridge 70a is provided with a latch groove 70a2, and a slide switch 70e for discriminating a write-protect state of the recording medium 70 in which erasure and recording of information on the recording medium 70 are inhibited. A button 70e1 is formed on the slide switch 70e in such a manner as to protrude outwardly from an upper surface of the recording medium cartridge 70a for causing a sliding motion of the slide switch 70e. A hookshaped engagement portion or member 70e2 is formed on the slide switch 70e.

The slide switch 70e has a connector 70e3 made of a conductive metal and formed into a bifurcated configuration having two legs with protrusions 70e4, 70e5, respectively, formed thereon, an end of one of the two connector legs being elastic. The recording medium cartridge 70a is formed integrally with a pair of connector plates 70e6, 70e7 which are respectively made of a conductive metal and formed into a planar configuration. The connector plates 70e6, 70e7 each have one surface exposed outside from a lower surface of the recording medium cartridge 70a and the other surface adapted to be in contact with the protrusions 70e4, 70e5, respectively. A position limiting member 70e8 is provided on the recording medium cartridge 70a for limiting, upon engagement with the engagement member 70e2, the movement of the slide switch 70e.

The FDD 71 further comprises a stepping drive motor 75 for driving the carriage 73 in a stepwise manner, and a control board 77 for controlling te read/write head 72, the stepping drive motor 75 and the recording medium drive motor 76.

In FIG. 29, a write-protect detector 78 is electrically connected with the control board 77 for detecting whether writing of information into the recording medium 70 is protected or permitted. The write-protect detector 78 has a pair of connector terminals 78a, 78b which are disposed in a face-to-face relation with respect to the connector plates 70e6, 70e7, respectively. The connector terminals 78a, 78b are fixedly secured to a switch holder 78c formed of a non-conductive material such as plastic resin and the like, in such a manner that they are not in contact with each other.

In FIG. 28, the FDD 71 further comprises a recording medium eject mechanism 79 for ejecting or discharging the recording medium 70 from the FDD 71. The recording medium eject mechanism 79 has a biasing member 79a for biasing or urging the recording medium 70 in a direction D to eject or discharge it, a shaft member 79b movable along an inserting or loading direction C or the ejecting or ejecting direction D, a button 79c fixedly mounted on the shaft member 79b at its one end disposed in the ejecting direction D, a latch 79d for limiting the movement of the recording medium 70, and a frame 80 which receives some of the above components 72 through 79 or to which the other of them are mounted An upper cover 81 is attached to the frame 80. Here, it is to be noted that the FDD 71 includes the above components 72 through 81.

Now, the operation of the above-mentioned conventional flexible recording system will be described below.

First, the slide switch 70e is moved to a predetermined position as shown in FIG. 28 through a manipulation of the button 70e1, and set there. At this position, the protrusions 70e4, 70e5 of the connector 70e3 are placed into contact with the connector plates 70e6, 7037, respectively, and thus electrically connected thereto.

Subsequently, as shown in FIG. 26, the recording medium 70 is moved from an initial state in which it is not loaded in the FDD 71 in the loading direction C so that it is inserted into the FDD 71 with the lower surface of the recording medium cartridge 70a being in flush with the hub 70b, as seen from FIG. 27.

As the recording medium 70 is inserted into the FDD 71, the rotation shaft 76d is thereby caused to move in a direction E indicated by a broken line. When the recording medium 70 being further inserted has reached a position in which the hole 70b1 in the hub 70b opposes to the rotation shaft 76d, the rotation shaft 76d is caused to move in the direction B in FIG. 27 under the biasing force of the spring 76h, so that it is fitted into the hole 70b1 in the hub 70b which is in flush with the lower surface of the recording medium cartridge 70a, whereupon by rotation of the chucking portion 76b, the convexities 70b2 of the hub 70b are placed into fitting engagement with the concavities 76c in the chucking portion 76b, so that the recording medium 70 is placed in position and held there through the hub 70b under the action of the magnetic force of the chucking portion 76b.

At this time, the recording medium cartridge 70a forces the latch 79d to rotate, thus unlatching the shaft member 79b. As a result, the shaft member 79b is moved in the ejecting direction D, placing a pin of the latch 79d into fitting engagement with the latch groove 70a2, and positioning the recording medium cartridge 70a in place to limit or restrict its movement. In this state, the biasing member 79a is in engagement with the groove in the recording medium cartridge 70a, urging it in the ejecting direction D.

Also, upon insertion of the recording medium 70, the shutter 70d is opened to permit the read/write head 72 to contact the recording surface of the recording medium 70 through the window 70c, so that information can be recorded into or reproduced from the recording medium 70.

Then, the operation of the write-protect detector 78 will be described. In a state where the recording medium cartridge 70a is positioned in place within the FDD 71 and thus properly mounted therein, the connector plates 70e6, 70e7 are in contact with the connector terminals 78a, 78b, respectively, of the write-protect detector 78. Since the connector 70e3 is in contact with the connector terminals 78a, 78b by way of the protrusions 70e4, 70e5 to be electrically connected thereto, the connector terminals 78a, 78b are electrically connected to each other. The control board 77 detects the conductive state of the write-protect detector 78 and controls, as a result of such detection, the operation of the read/write head 72.

It is generally determined that writing is permitted in case of the conductive state, but not in the non-conductive state. However, this can be reversed.

Although not illustrated, in order to make the connector terminals 78a, 78b non-conductive, the button 70e1 is moved to the right in FIG. 28, causing the engagement member 70e2 into engagement with the position limiting member 70e8, whereby the protrusion 70e4 is abutted against the connector plates 70e7, rendering the connector plate 70e6 into an electrically disconnected state to the connector 70e3. As a result, the connector terminals 78a, 78b of the write-protect detector 78 are electrically disconnected from each other.

Recently, miniaturization of an information processing device, in particular a portable information terminal, is advanced, and hence reduction in size of a flexible disk drive such as the FDD 51 as used in these devices is also advanced. However, the size of the recording medium 50 employed with the FDD 51 is generally 3.5 inches and the dimensions of the FDD 51 are 100 mm wide, 130 mm long, and 17.5 mm–250 mm thick.

In comparison with this, a memory card such as a so-called PC card, the specifications for which are decided by PCMICA (Personal Computer Memory Card Association) in the United States of America, is 54.0 mm wide, but varies in thickness, i.e., 3.3 mm, 5.0 mm, 10.5 mm, and so on. A recording device of such a small size is very effective for further miniaturization of the portable information terminal, but with such a memory card containing an IC memory as a recording medium, it is not possible to exchange the IC memory alone, but instead the IC memory card itself must be exchanged as a whole. In addition, since the IC memory itself is expensive, the price of the IC memory card is also high. Accordingly, the cost gets expensive when the IC memory card is used to exchange the recording medium.

In these circumstances, it may be considered that the FDD 51, for which the recording medium 50 used therein is low in price and easy to exchange, is made smaller in size and thinner, for this purpose. In this regard, however, upon mounting or loading the recording medium 50 into the FDD 51, the recording medium 50 is moved in the thickness direction by means of the cartridge holder 58 and the slide cam 59 so as to bring the drive pin 56c and the spindle shaft 56d of the recording medium drive motor 56 into fitting engagement with the corresponding holes 50b1, 50b2 in the hub 50b of the recording medium 50, thus holding the recording medium 50 in a rotatable manner. Consequently, in order to ensure engagement between the hub 50b and spindle shaft 56d or the drive pin 56c upon loading and unloading of the recording medium 50, an ample space is required in the thickness direction, making it difficult to reduce the overall size and thickness of the FDD 51.

Furthermore, the second-mentioned conventional flexible recording system has the following problems. In order to detect whether recording or erasure of information into or from the recording medium 70 is permitted, the recording medium 70 used for the conventional flexible recording system is provided with the slide switch 70e which is formed of a bifurcated metal plate and has the connector 70e3 with the protrusions 70e4, 70e5, and the FDD 71 is provided with the write-protect detector 78 having the connector terminals 78a, 78b in contact with the connector plates 70e6, 70e7, respectively. Thus, this flexible recording system is complicated in its construction.

Upon mounting the recording medium 70 into the FDD 71, the connector plates 70e6, 70e7 are in sliding contact with the connector plates 70e6, 70e7, so that both or one of them are(is) subjected to wearing, giving rise to a problem of poor electrical contact with the result that normal or correct detection of write protection of the recording medium 70 sometimes becomes impossible.

Since there is no special means for detecting the presence and absence of the recording medium 70 in the FDD 71, such a detection is made indirectly by whether or not the read/write head 72 can extract a reproducing signal from the recording medium 70, so electrical circuitry used for this purpose becomes necessarily complicated in construction, and there is a fear that if no information is recorded in the recording medium 70, it might be mistakenly determined that no recording medium 70 is present in the FDD 71.

Moreover, owing to the spherical configuration of the rotation shaft 76d, the state of engagement of the rotation shaft 76d with the hole 70b1 in the hub 70b is liable to be unstable, so it is difficult for the recording medium 70 to be rotated in a stable manner. Still further, since positioning in the rotating direction of the recording medium 70 is effected by engagement of the rotation shaft 76d with the hole 70b1 in the hub 70b and engagement of the convexities 70b2 of the hub 70b with the concavities 76c in the chucking portion 76b, accuracy of such positioning is not good.

SUMMARY OF THE INVENTION

In view of the above, the present invention is intended to obviate the above-mentioned various problems encountered with the conventional flexible recording systems.

An object of the present invention is to provide a novel and improved flexible recording system, a flexible disk drive and a recording disk in which a recording medium can be loaded and unloaded without requiring its movement in a thickness direction of a flexible disk drive.

Another object of the prevent invention is to provide a novel and improved flexible recording system, a flexible disk drive and a recording disk which can be reduced in size to such an extent as a memory card while ensuring satisfactory reliability in operation.

A further object of the present invention is to provide a novel and improved flexible recording system, a flexible disk drive, and a recording disk in which upon insertion of a recording medium into a flexible disk drive, a write-protect detector is not subjected to wearing so that it can precisely detect the state (i.e., write protection or permission) of the recording medium as well as the presence and absence thereof.

According to one aspect of the present invention, there is provided a flexible recording system comprising:

a recording disk having a disk-shaped recording medium and a recording medium cartridge rotatably receiving therein the recording medium; and a flexible disk drive;

the flexible disk drive comprising:

a magnetic head for recording information into the recording medium or reproducing information recorded in the recording medium;

a carriage mechanism for moving the magnetic head;

a recording medium drive motor for driving the recording medium to rotate;

a frame having an insertion opening through which the recording disk is inserted, and a recording medium mounting portion formed adjacent the insertion opening in a direction in which the recording disk is inserted for mounting thereon the recording disk; and a recording-disk ejection mechanism for ejecting the recording disk from the frame;

wherein the recording disk has a write-protect instructing member which comprises a hole formed in an end face of the recording medium cartridge disposed at one side thereof from which the recording disk is inserted into the frame, and means for opening and closing the hole; and wherein the flexible disk drive has a write-protect detector provided on the disk mounting portion at its one end from which the recording disk is inserted into the flexible disk drive for detecting permission or inhibition of writing into the recording medium based on an open or closed state of the hole.

In a preferred form of the flexible recording system, the write-protect detector has a first detection pin which is projected in an ejecting direction in which the recording disk is ejected from the flexible disk drive, and which is movable in an inserting direction in which the recording disk is inserted into the flexible disk drive, and the write-protect detector detects an open or closed state of the hole based on whether the first detection pin is pushed by the means.

In another preferred form of the flexible recording system, the flexible disk drive has a recording disk detector provided at the disk-inserting direction side end of the disk mounting portion for detecting the presence or absence of the recording disk.

In a further preferred form of the flexible recording system, the recording disk detector has a second detection pin which is projected in an ejecting direction in which the recording disk is ejected from the flexible disk drive, and which is movable in an inserting direction in which the recording disk is inserted into the flexible disk drive, and the recording disk detector detects the presence or absence of the recording disk based on whether the second detection pin is pushed by the recording disk.

In a still further preferred form of the flexible recording system, the write-protect detector and the recording disk detector are integrally formed into a single housing, and the first detection pin and the second detection pin are disposed in opposition to the end face of the recording disk.

In a yet further preferred form of the flexible recording system, the means for opening and closing the hole comprises a spacer removably fitted in the hole.

In a further preferred form of the flexible recording system, the means for opening and closing the hole comprises a sliding lid movable along the end face of the recording medium cartridge for opening and closing the hole.

In a further preferred form of the flexible recording system, the recording disk further has a hub to which the recording medium is fixedly secured and which is received in the recording medium cartridge and supported by a support shaft for movement in a direction perpendicular to the recording surface of the recording medium, and the recording medium cartridge has an opening through which a surface of the hub is protruded outwardly of the recording medium cartridge, and the recording medium drive motor has a drawing member for drawing the hub and rotates the recording medium while holding the surface of the hub protruded from the opening outwardly of the recording medium cartridge.

In a further preferred form of the flexible recording system, the recording medium drive motor has a cylindrical rotation shaft of a predetermined length along an axial direction thereof movable therealong and adapted to be displaced toward the recording disk to engage into an axial hole in the hub.

In a further preferred form of the flexible recording system, the rotation shaft of the recording medium drive motor is urged toward the recording disk by means of a spring.

In a further preferred form of the flexible recording system, the recording medium drive motor has a drive pin disposed radially of the rotation shaft for movement therealong and adapted to engage the hub for driving the recording medium to rotate.

In a further preferred form of the flexible recording system, the rotation shaft and the drive pin of the recording medium drive motor are urged toward the recording disk by one and the same spring.

In a further preferred form of the flexible recording system, the hub has a first annular engagement portion having a center thereof on a center line passing through a center of the recording medium, and a reception chamber formed between the first engagement portion and the surface of the hub, and the recording disk has a position adjusting member which is received in the reception chamber and which has a second engagement portion engageable with the rotation shaft of the recording medium drive motor and a third engagement portion engageable with the first engagement portion so as to position the center thereof on an axis of rotation of the recording medium, the position adjusting member being held at a predetermined position of the rotation shaft through engagement of the second engagement portion with the rotation shaft and positioning the center of the first engagement portion on the axis of rotation through the third engagement portion.

In a further preferred form of the flexible recording system, the rotation shaft of the recording medium drive motor has a chamfered portion formed at one end thereof near the recording disk, and the second engagement portion of the position adjusting member is formed into a configuration to match the chamfered portion.

According to another aspect of the present invention, there is provided a flexible disk drive comprising:

a magnetic head for recording information into a recording medium of a recording disk or reproducing information recorded in the recording medium;

a carriage mechanism for moving the magnetic head;

a recording medium drive motor for driving the recording medium to rotate;

a frame having an insertion opening through which the recording disk is inserted, and a recording medium mounting portion formed adjacent the insertion opening in a direction in which the recording disk is inserted for mounting thereon the recording disk; and a recording-disk ejection mechanism for ejecting the recording disk from the frame;

a recording medium detector provided on the disk mounting portion at its one end from which the recording disk is inserted into the flexible disk drive for detecting the presence or absence of the recording medium; and a write-protect detector provided on the disk mounting portion at its one end from which the recording disk is inserted into the flexible disk drive for detecting permission or inhibition of writing information into or erasing information from the recording medium.

In a preferred form of the flexible disk drive, the recording medium drive motor has a cylindrical rotation shaft of a predetermined length along an axial direction thereof, and a table supporting the rotation shaft for movement along the axial direction and having a drawing member for drawing the hub of the recording medium outwardly of the recording medium cartridge, the recording medium drive motor being adapted to draw the hub to protrude and hold it outwardly of the recording medium cartridge and at the same time to displace the rotation shaft toward the recording medium to engage it into an axial hole in the hub.

In another preferred form of the flexible disk drive, the rotation shaft of the recording medium drive motor is urged toward the recording medium by means of a spring.

In a further preferred form of the flexible disk drive, the recording medium drive motor has a drive pin disposed radially of the rotation shaft for movement therealong and adapted to engage the hub for driving the recording medium to rotate.

In a still further preferred form of the flexible disk drive, the rotation shaft and the drive pin of the recording medium drive motor are urged toward the recording disk by one and the same spring, According to a further aspect of the present invention, there is provided a recording disk comprising:

a disk-shaped recording medium;

a recording medium cartridge rotatably receiving therein the recording medium; and a write-protect instructing member having a hole formed in an inserting direction side end face of the recording medium cartridge, and means for opening and closing the hole.

In a preferred form of the recording disk, the means for opening and closing the hole comprises a spacer removably fitted in the hole.

In another preferred form of the recording disk, the means for opening and closing the hole comprises a sliding lid movable along the end face of the recording medium cartridge for opening and closing the hole.

In a still further preferred form of the recording disk, the recording disk further comprises a hub to which the recording medium is fixedly secured and which is received in the recording medium cartridge and supported by a support shaft for movement in a direction perpendicular to the recording surface of the recording medium, wherein the recording medium cartridge has an opening through which a surface of te hub is protruded outwardly of the recording medium cartridge.

In a yet further preferred form of the recording disk, the recording disk further comprises a position adjusting member for adjusting the position of the recording medium through the hub such that an axis of rotation of the recording medium rotated by the recording medium drive motor substantially coincides with the center of the recording medium.

In a further preferred form of the recording disk, the hub has a first annular engagement portion having a center thereof on a center line passing through a center of the recording medium, and a reception chamber formed between the fist engagement portion and the surface of the hub, and the position adjusting member is received in the reception chamber and has a second engagement portion engageable with the rotation shaft of the recording medium drive motor and a third engagement portion engageable with the first engagement portion so as to position the center thereof on an axis of rotation of the recording medium, the position adjusting member being held at a predetermined position of the rotation shaft through engagement of the second engagement portion with the rotation shaft and positioning the center of the first engagement portion on the axis of rotation through the third engagement portion.

In a further preferred form of the recording disk, the first engagement portion of the hub and the third engagement portion of the position adjusting member have substantially the same diameter, and the first engagement portion or the second engagement portion is of a cone-shaped configuration.

The above and other objects, features and advantages of the present invention will become more readily apparent from the following detailed description of preferred embodiments of the invention take in conjunction with the accompanying drawings.

BRIEF DESCRIPTION OF THE DRAWINGS

FIG. 3 is a cross-sectional view taken along line FF';

FIG. 4(a) shows the recording disk of FIGS. 1(a) and 1(b) as viewed from different points;

FIG. 4(b) is a cross-sectional view taken along line GG' of FIG. 4(a);

DESCRIPTION OF THE PREFERRED EMBODIMENTS

Now, preferred embodiments of the present invention will be described in detail while referring to the accompanying drawings.

Embodiment 1

FIGS. 1(a) through FIG. 11 show a flexible recording system in accordance with a first embodiment of the present invention.

Figure 1A:
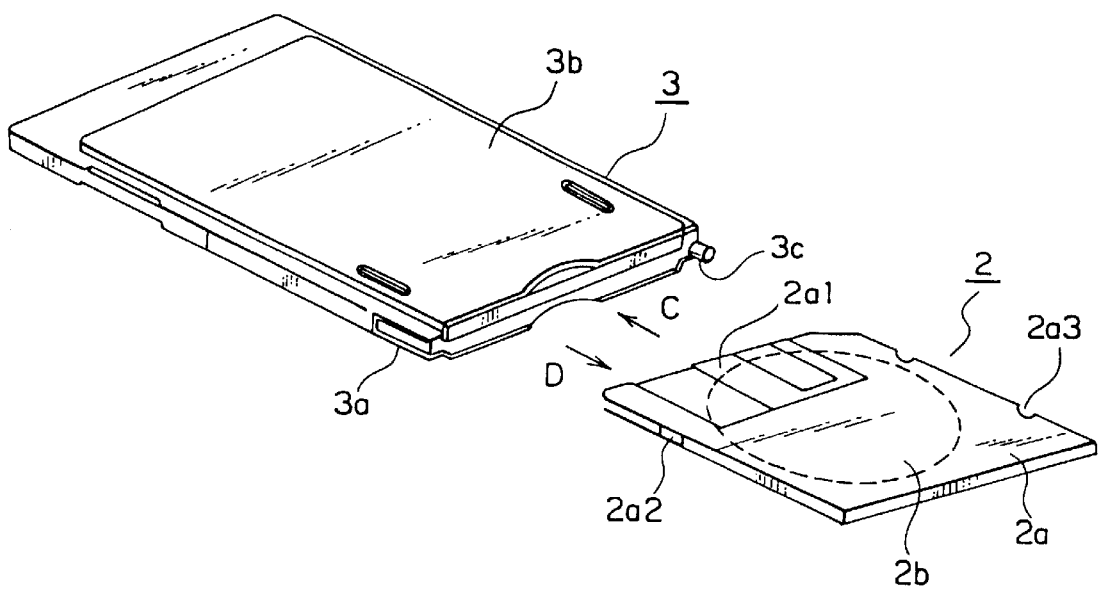
FIG. 1(a) is a perspective view of a flexible recording system in accordance with the present invention, showing that a recording disk is not inserted into but separated from a flexible disk drive.
Figure 1B:
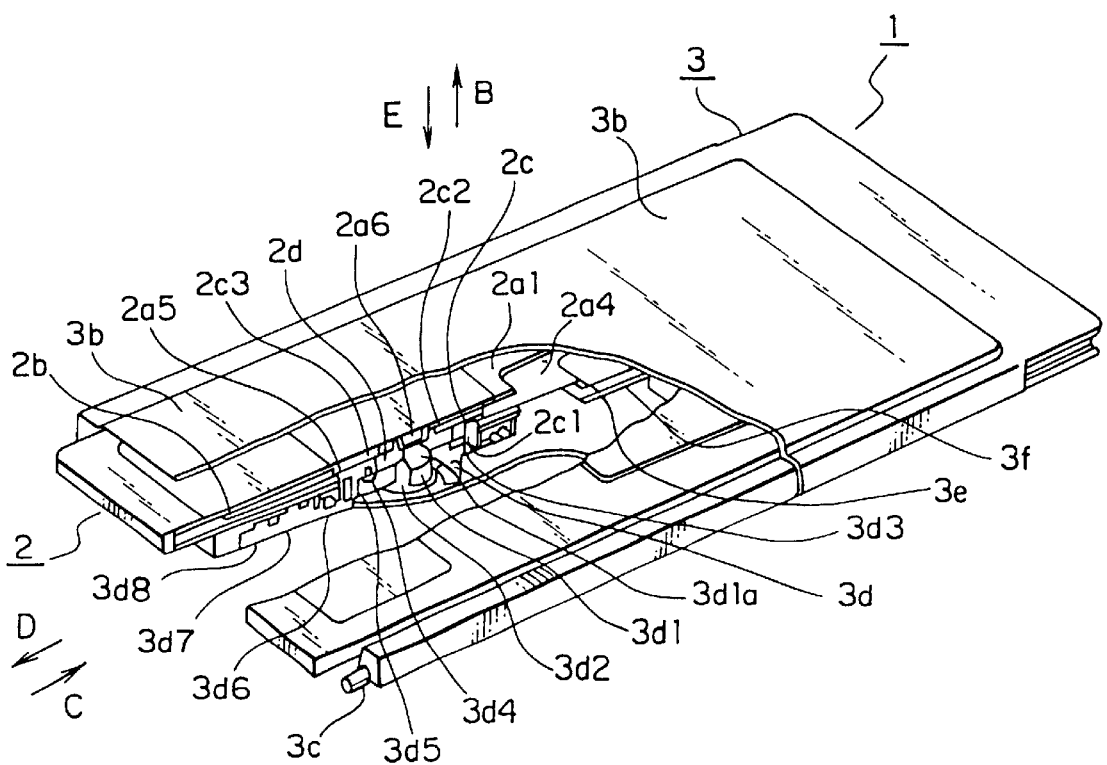
FIG. 1(b) is a partially broken perspective view of the same, with the recording disk inserted into the flexible disk drive.
Figure 2:
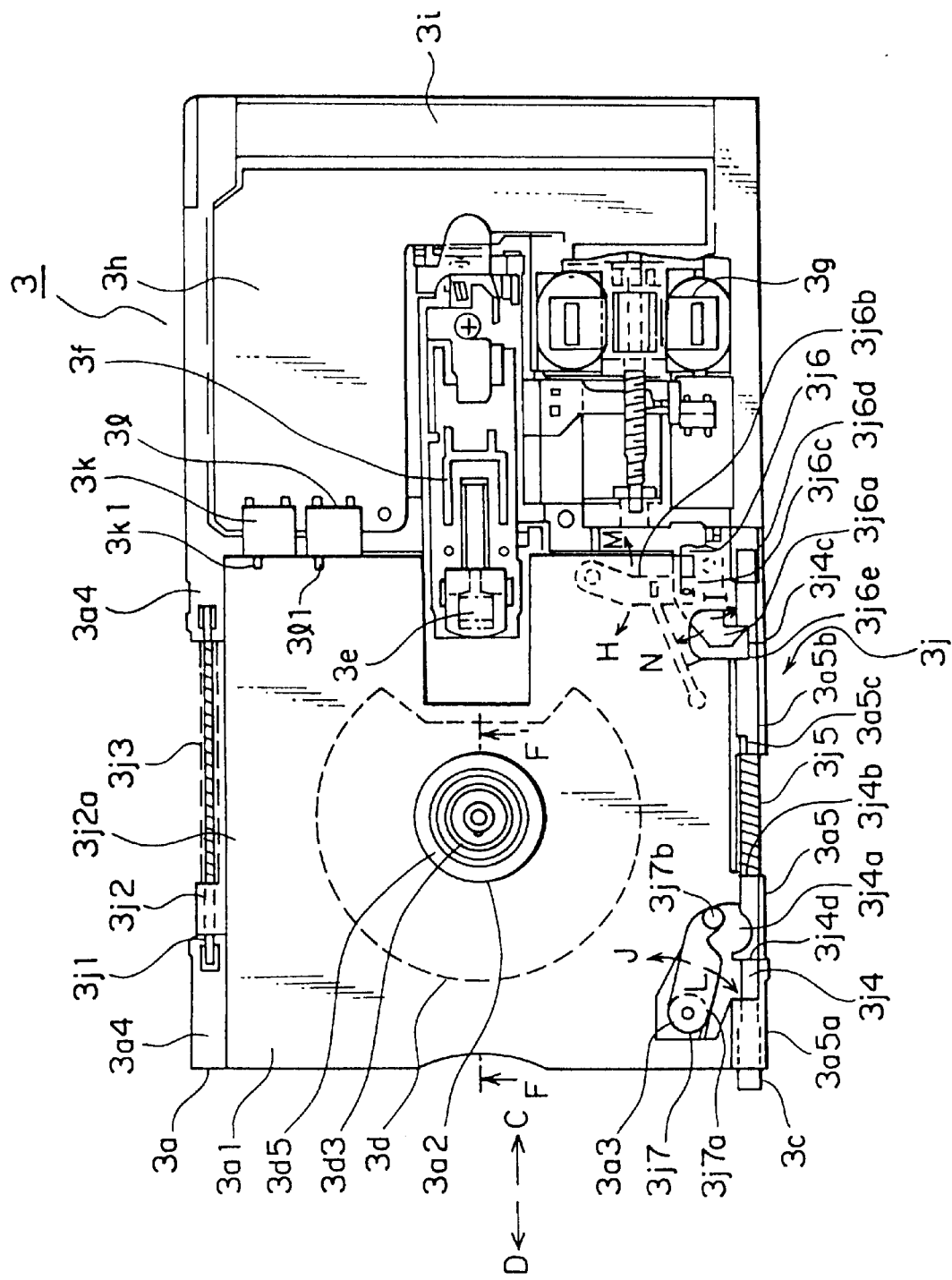
FIG. 2 is a plan view of the flexible disk drive of FIG. 1(a) and FIG. 1(b)

FIG. 1(a) shows in perspective form the flexible recording system with a recording disk being not mounted or loaded therein; FIG. 1(b) shows in perspective and partially broken form the flexible recording system with the recording disk being mounted or loaded therein; FIG. 2 shows the same in a plan view; FIG. 3 also shows the same in cross section taken along line FF' of FIG. 2; FIGS. 4(a) and 4(b) show details of the recording disk of FIGS. 1(a) and 1(b) wherein FIG. 4(a) shows the outline configuration or external appearance of the recording disk, and FIG. 4(b) shows a cross section of the same taken along line GG' of FIG. 4(a). In these figures, like or corresponding parts or elements are identified by the same symbols as in FIGS. 24 through 29, and a detailed description thereof is omitted.

In these figures, a recording disk 2 to which information is magnetically recorded includes a recording medium cartridge 2a in which a recording disk 2, a hub for holding the recording medium 2b and a position correcting or adjusting member are housed. The recording medium cartridge 2a has a shutter 2a1, a groove 2a2 formed in one side edge or end face of the cartridge 2a along an inserting direction C or an ejecting direction D in which the recording disk 2 is inserted into or ejected from a flexible disk drive (FDD) 3, and two arcuate or semi-circular recess 2a3 formed in the other opposed side edge or end face of the cartridge 2. The recording medium cartridge 2a of the recording disk 2 is substantially of a rectangular configuration having dimensions of 47 mm wide, 49.5 mm long, and 2 mm thick, for example. The recording medium 2b is of a circular shape having a diameter of about 1.7 inches and is received in the recording medium cartridge 2a.

The FDD 3 serves to magnetically record information into the recording disk 2 and reproduce information recorded therein. The FDD 3 comprises a frame 3a, an upper cover 3b, and a recording medium eject mechanism 3i with an eject button 3c fixedly mounted thereon. The FDD 3 has dimensions of 54 mm wide, 90 mm long, and 5 mm thick, for example. The width and thickness of The FDD 3 are substantially equal to those of a PCMCIA memory card, and can be inserted or loaded into the mounting portion 91a of the slot 91 (see FIG. 24).

In FIG. 2, The FDD 3 further includes a recording medium drive motor or actuator 3d for driving the recording medium 2b, a magnetic head or read/write head 3e adapted to slidingly move or and along a recording surface of the recording medium 2b for magnetizing it to magnetically record information thereinto or reproduce magnetized information therefrom.

The frame 3a has a disk-mounting portion 3a1 for mounting thereon the recording disk 2 at a predetermined position. The disk-mounting portion 3a1 is provided adjacent an insertion opening of the recording disk 2 in the inserting or loading direction C so that the recording disk 2 can be inserted or loaded into the disk-mounting portion 3a1 without any movement of the entire body thereof in a direction B or E perpendicular to the upper and lower surfaces of the frame 3a, i.e., perpendicular to the loading and ejecting directions C, D.

The frame 3a has a through-hole 3a2 formed therethrough for fixedly receiving a bearing 3d5 to be described later. The disk-mounting portion 3a1 is provided with a recess 3a4. The frame 3a is provided with a guide attaching member 3a4 formed at one side of the disk-mounting portion 3a1, and a shaft support member 3a5 formed at the other side of the disk-mounting portion 3a1. The shaft support member 3a5 has a through-hole 3a5a formed through the frame 3a along the loading direction C or the ejecting direction D, a groove 3a5b formed on the frame 3a along the loading direction C and the ejecting direction D, and an engagement member 3a5c.

A carriage mechanism 3f is provided on the frame 3a for movement in a radial direction of the recording medium 2b, and has the magnetic head 3e fixedly secured thereto at one end thereof. A stepping drive motor 39 is fixedly mounted on the frame 3a for driving the carriage mechanism 3f to move in a radial direction of the recording medium 2b by a predetermined length at a time in a stepwise manner.

A controller 3h controls information-recording and information-reproducing operations of the magnetic head 3e, and the stepping drive motor 3g. An interface 3i is connected to the controller 3h and external devices such as, for example, the slot 91 (see FIG. 24) and the like for communicating signals therebetween.

The FDD 3 further includes a recording medium ejection mechanism, generally designated at 31, for ejecting or unloading the recording medium 2b therefrom. The recording medium ejection mechanism 3j comprises a recording medium ejection member 3j2 to be detailed later, and a guide member 3j1 of a cylindrical configuration with a diameter of about 2.0 mm fixedly secured to the guide attaching member 3a4 for guiding the movement of the recording medium ejection member 3j2 in the mounting or loading direction C or in the ejecting or unloading direction D. The recording medium ejection member 3j2 has a through-hole formed through the frame 3a in the loading direction C or in the unloading direction D, through which the guide member 3j1 extends, in such a manner that it is movable along the guide member 3j1. The recording medium ejection member 3j2 further has a pawl 3j2a adapted to engage the groove 2a2 (see FIG. 1(a)) in the recording disk 2, and a spring 3j3 for biasing or urging the recording medium election member 3j2 in the unloading direction D at all times.

A shaft 3j4 is fixedly attached at its one end on the ejecting direction D side to the eject button 3c and supported by a shaft support member 3a for movement along the loading direction C and the unloading direction D. The shaft 3j4 also serves to position the recording disk 2 and release the positioning thereof. The shaft 3j4 is formed with a recess 3j4a opening toward the guide member 3j. The recess 3j4a is tapered at its opposite ends in the loading direction C and in unloading direction D.

The shaft 3j4 further has a spring retainer 3j4 which receives one end of the spring 3j3 so as to be thereby urged in the unloading direction D, a notch 3j4c opening toward the guide member 3j1 and adapted to be engaged with a latch pawl 3j6a of a latch 3j6 to be described later when the recording disk 2 is not mounted on the FDD 3, and a slip-off preventing member 3j4d for preventing the shaft 3j4 from slipping off the shaft support member 3a5 in the unloading direction D.

A spring 3j5 is disposed between and in abutment at its opposite ends with a spring retainer 3j4b and a hook or engagement member 3a5c for urging the shaft 3j4 in the unloading direction D at all times.

Figure 5:
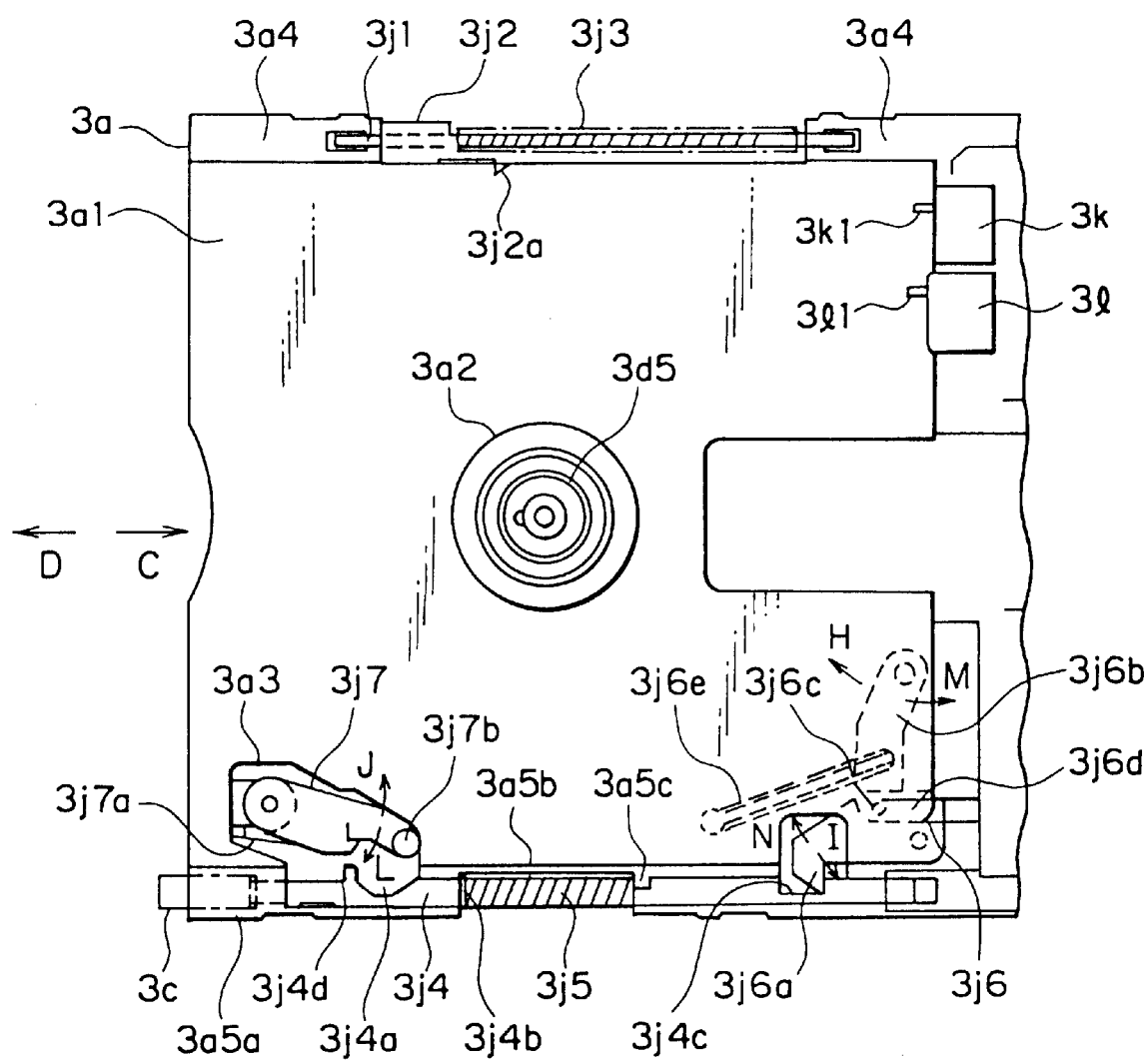
FIG. 5 is a partially cut-away plan view of the flexible disk drive before loading of the recording disk.
Figure 6:
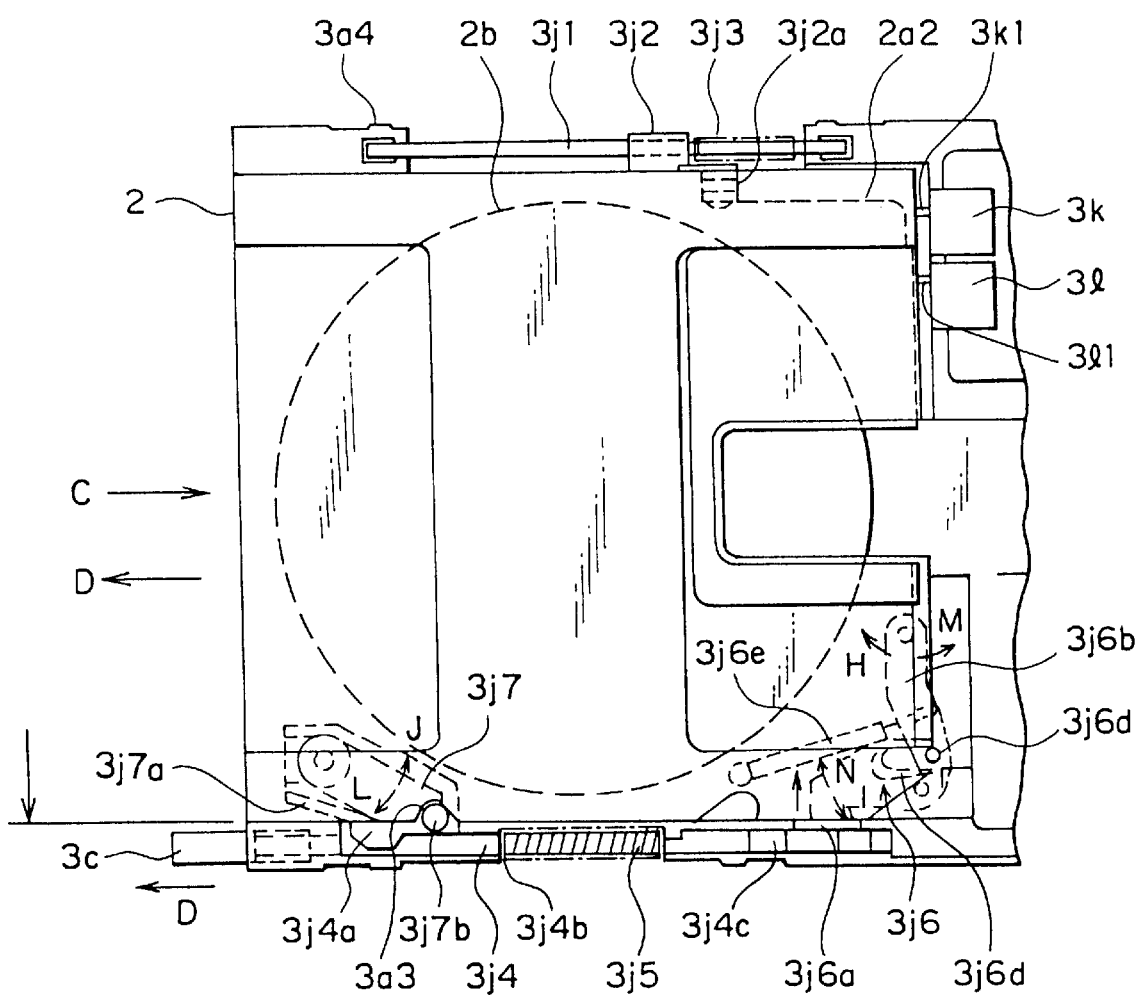
FIG. 6 is a view similar to FIG. 5, but showing the flexible disk drive after loading of the recording disk.
Figure 7:
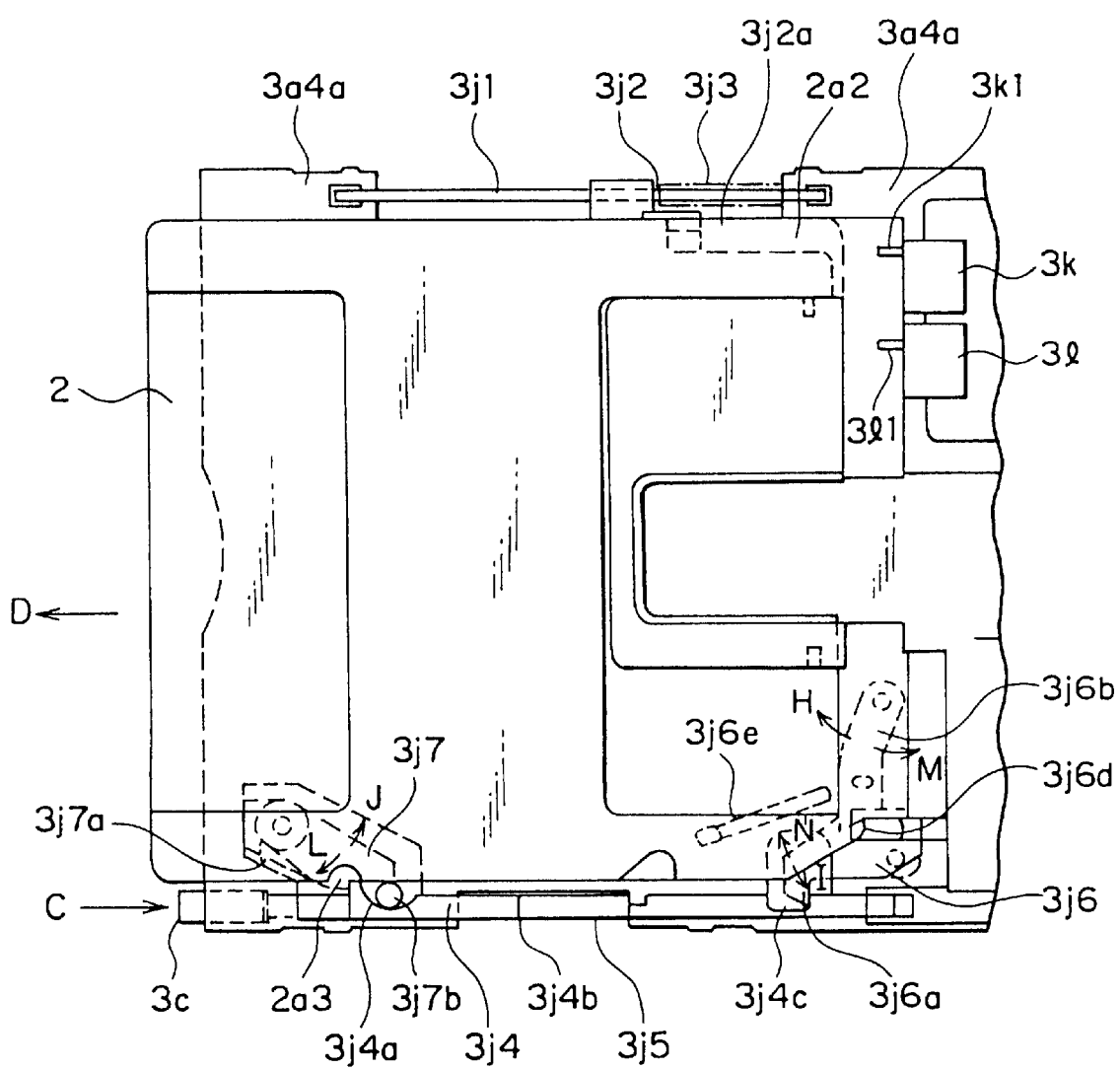
FIG. 7 is a view similar to FIG. 5, but showing the flexible disk drive upon unloading of the recording disk.

The latch 3j6 has the latch pawl 3j6a rotatably supported on the frame 3a and adapted to engage the notch 3j4c in the shaft 3j4 for restricting the movement of the shaft 3j4 in the unloading direction D upon unloading of the recording disk 2, a latch limiting plate 3j6b rotatably supported at its one end on the frame 3a, a latch pin 3j6c provided at the other end of the latch limiting plate 3j6b so as to project above the disk-mounting portion 3a1 and engaging in an elongated hole 3j6d in the latch pawl 3j6a, and a spring 3i6e for urging the latch limiting plate 3j6b so as to rotate it in a direction H as shown in FIGS. 5 through 7 at ail times.

Here, it is to be noted that since the latch limiting plate 3j6b is always urged to rotate in the direction H by means of the spring 3j6e, the latch pin 3j6c always urges, through an end of the elongated hole 3j6d at the unloading direction D side, the latch pawl 3j6a to rotate in a direction I as shown in FIGS. 6 through 7.

A stop 3j7 is rotatably supported on the frame 3a within a recess 3a3 and urged by a flat or plate spring 3j7a to rotate in a direction J as shown in FIGS. 5 through 7. The stop 3j7 is provided at its one end with a pin 3j7b which is pushed by the shaft 3j4 to hold the recording disk 2 at the predetermined position. It is to be noted that the recording medium ejection mechanism 3j includes the above components 3j1 through 3j7b, and 3c.

A write-protect detector 3k is provided at one end of the disk-mounting portion 3a1 on the mounting or loading direction C side for detecting whether recording and erasure of information into or from the recording medium 2b are permitted. The write-protect detector 3k has a first detection pin 3k1 which is movable in the loading direction C or the unloading direction D and urged by an unillustrated spring toward the unloading direction D so as to protrude from the write-protect detector 3k. The first detection pin 3k1 is provided, at its one end on the loading direction C side, with a terminal (not shown) which, when moved in the loading direction C, is placed into contact with two terminals (not shown) of the write-protect detector 3k to establish electrical connection therebetween.

A recording medium detector 31 is provided at one end of the disk-mounting portion 3a1 on the loading direction C side for detecting the presence and absence of the recording disk 2 in the FDD 3. The recording medium detector 31 has a second detection pin 3l1 which is movable in the loading direction C or the unloading direction D and urged by an unillustrated spring toward the unloading direction D so as to protrude from the recording medium detector 31. Similar to the first detection pin 3k1, the second detection pin 3l1 is provided, at its one end on the loading direction C side, with a terminal (not shown) which, when moved in the loading direction C, is placed into contact with two terminals (not shown) of the recording medium detector 31 to establish electrical connection therebetween.

As shown in FIGS. 1(b) and FIG. 3, the recording medium drive motor 3d has a spindle shaft or rotation shaft 3d1 of a cylindrical configuration which is formed at its distal end with a chamfer 3d1a, a drive pin 3d2 disposed in a radial direction of the rotation shaft 3d1, a table 3d3 which is in abutment with a surface 2c1 of a hub 2c to be held (see FIG. 4) and supports the rotation shaft 3d1 and the drive pin 3d2 for movement in a direction B or E, i.e., along the axial direction of the rotation shaft 3d1, a magnet 3d4 mounted on the table 3d3 for magnetically attracting the surface 2c1 of the hub 2c, a bearing 3d5 for rotatably supporting the table 3d3, a rotating member in the form of a rotor 3d6 fixedly secured at its center to the table 3d3 and having a rotor motor mounted on the peripheral portion thereof, and a stationary member in the form of a stator 3d7 formed of a magnetic material and wound by a coil 3d8.

The table 3d3 is provided at its peripheral portion with a hub escaping member 3d3a having a portion protruded from the peripheral portion of the table 3d3 in a direction B, the protruded portion being tapered in a direction from a base portion to its protruded end in such a manner as to open greatly toward the direction B. A spring 3d9 is provided for urging the rotation shaft 3d1 and the drive pin 3d2 in a direction E at all times. In FIG. 3, K indicates the axial length of the rotation shaft 3d1. The recording medium drive motor 3d includes the above components 3d1 through 3d9, and the FDD 3 includes the above-described components 3a through 3l.

FIG. 4(a) includes four-side views of the recording disk 2, as seen from four different directions. In FIG. 4(a), the recording medium cartridge 2a of the recording disk 2 has a window 2a4 which is opened and closed by the shutter 2a1. The recording medium cartridge 2a is provided with an opening 2a5 having such a size as to allow the surface 2c1 of the hub 2c to protrude outward therethrough.

The recording medium cartridge 2a has a tapered portion 2a7, a guide groove 2a8 for supporting the shutter 2a1 for movement therealong, and a write-protect instructing member 2a9 which has an aperture or cavity 2a9a formed at its one end on the loading direction C side in which the recording medium cartridge 2a is inserted or loaded, and a spacer 2a9b detachably mounted therein.

The hub 2c is fixedly secured to the recording medium 2b around the periphery of a central hole formed therethrough, and has an axial hole 2c4 defined in its surface 2c1 to be held. The axial hole 2c4 comprises a positioning hole 2c4a of a rectangular shape engageable at its two orthogonal sides with the rotation shaft 3d1, and a drive hole 2c4b coupled to one side of the positioning hole 2c4a and inclined in a radial direction so as to be engageable with the drive pin 3d2, as shown in FIG. 3.

In FIG. 4(b), the recording medium cartridge 2a has a support shaft 2a6 which protrudes from a surface of the cartridge 2a opposing the opening 2a5 therein toward that opening 2a5 in such a manner as to form a cylindrical configuration. The surface 2c1 of the recording medium 2b to be held is made of a magnetic material and formed into a stepwise configuration with a step being convexed toward the opening 2a5 rather than the information-recording surface of the recording medium 2b, so that the stepped surface 2c1 can be protruded from the opening 2a5 outside the recording medium 2b.

The hub 2c further includes an engagement member 2c2 which is disposed on the support shaft 2a6 side in opposition to the surface 2c1 and has an annular engagement portion 2c2a integrally formed therewith with a central aperture defined therethrough. The annular engagement portion 2c2a is inclined or tapered radially inwardly toward the central aperture and depressed or protruded toward the surface 2c1 to form a cone-shaped configuration. The annular engagement portion 2c2a is disposed concentric to the recording medium 2b, that is the central point of the annular engagement portion 2c2a is in alignment with the center axis of the recording medium 2b. A reception space or chamber 2c3 is defined between the surface 2c1 and the engagement member 2c2 inside the stepped or depressed surface 2c1.

A position adjusting member 2d is disposed in the reception chamber 2c3 with a certain play therearound. The position adjusting member 2d is provided with a cylindrical portion 2d1 having an inner diameter greater than an outer diameter of the support shaft 2a6 The position adjusting member 2d has the support shaft 2a6 inserted into the cylindrical portion 2d1 so that it is thereby supported in such a manner as to be movable in a direction perpendicular to the information-recording surface of the recording medium 2b (i.e., in the direction B or E), as well as in a direction along or parallel to that information-recording surface. The position adjusting member 2*d* is also movable along the information-recording surface of the recording medium 2*b* by an amount of difference between the inner diameter of the cylindrical portion 2*d*1 and the outer diameter of the support shaft 2*a*6.

The cylindrical portion 2*d*1 is formed at its one end on the opening 2*a*5 side with an engagement portion 2*d*2 which is tapered so as to snugly fit or match with the chamfered portion 3*d*1*a* of the tip end of the rotation shaft 3*d*1 (see FIG. 3). A disk-shaped portion 2*d*3 is provided on the position adjusting member 2*d* and extends from one end thereof near the opening 2*a*5 toward a direction along the information-recording surface of the recording medium 2*b* to form a disk-like configuration. The disk-shaped portion 2*d*3 has an annular engagement portion 2*d*3*a* which is formed by protruding the outer periphery of the disk-shaped portion 2*d*3 toward the engagement member 2*c*2 in an inclined manner so as to provide a cone-shaped configuration, as in the case of the annular engagement portion 2*c*2*a*.

Now, the operation of this embodiment will be described while referring to FIGS. 5 through 7 which illustrate the operation of loading and unloading the recording disk 2. FIG. 5 shows a recording disk 2 before being loaded; FIG. 6 shows a recording disk 2 after being loaded; and FIG. 7 show a recording disk 2 during unloading operation. In these figures, like or corresponding parts are identified by the same symbols as in FIGS. 1 through 4.

First, the loading operation of the recording disk 2 will be described. As shown in FIG. 5, in the absence of the recording disk 2, the shaft 3*j*4 is limited or restricted in its movement by means of the latch pawl 3*j*6*a* and positioned on the loading direction C side. The recording medium ejection member 3*j*2 is urged to position on the unloading direction D side under the action of the spring 3*j*3.

Subsequently, when the recording disk 2 is inserted into the FDD 3 and moved in the loading direction C, the groove 2*a*1 on one side of the recording medium cartridge 2*a* engages the pawl 3*j*2*a* of the recording medium ejection member 3*j*2, thereby causing the recording medium ejection member 3*j*2 to move in the loading direction C against the biasing force of the spring 3*j*3.

The tapered portion 2*a*7 on the other side of the recording medium cartridge 2*a* comes into abutting engagement with the pin 3*j*7*b* of the stop 3*j*7, thus causing the stop 3*j*7 to rotate in the direction L against the biasing force of the flat spring 3*j*7*a* under the action of inclination or tapering of the tapered portion 2*a*7. As a result of this rotation, the pin 3*j*7*b* is received in the recess 3*j*4*a* in the shaft 3*j*4.

As the recording disk 2 is further inserted, the recording medium cartridge 2*a* abuts against the latch pin 3*j*6*c* of the latch 3*j*6 to push the latch pin 3*j*6*c* in the loading direction C. Since the latch pin 3*j*6*c* is provided on the latch limiting plate 3*j*6*b* rotatably supported on the frame 3*a*, the latch limiting plate 3*j*6*b* is forced to rotate against the biasing force of the spring 3*j*6*e*.

When the recording disk 2 is further inserted, the latch pin 3*j*6*c* comes into abutment against the loading direction C side end of the elongated hole 3*j*6*d* whereby the latch pawl 3*j*6*a* is caused to rotate in the direction N, releasing the engagement with the recess 3*j*4*a* in the shaft 3*j*4. Upon release of such engagement, the shaft 3*j*4 is displaced toward the unloading direction D under the biasing force of the spring 3*j*5, whereupon the eject button 3*c* secured to the protruded-side end of the shaft 3*j*4 is caused to project by a predetermined length.

As the shaft 3*j*4 moves toward the unloading direction D, the pin 3*j*7*b* of the stop 3*j*7 is forced to get out of the recess 3*j*4*a* in the shaft 3*j*4 along the tapered portion 2*a*7, so as to be received into one of the arcuate recesses 2*a*3 formed on the other side of the recording medium cartridge 2*a*, as shown in FIG. 6. At this time, the stop 3*j*7 is always urged to rotate in the direction J by means of the flat spring 3*j*7*a*, and the pin 3*j*7*b* of the stop 3*j*7 abuts against the shaft 3*j*4, thus being restricted from rotation in the direction L As a result, the pin 3*j*7*b* is retained in the recess 3*j*4*a* in the shaft 3*j*4, so the recording disk 2 is positioned at a predetermined location against the biasing force of the spring 3*j*3 acting thereon in the direction D through the recording medium ejection member 3*j*2.

Upon loading of the recording disk 2, the recording medium drive motor 3*d* acts to hold the surface 2*c*1 of the hub 2*c*, which is drawn to the magnet 3*d*4 to protrude outwardly of the recording medium cartridge 2*a*, and force the drive pin 3*d*2 of the rotation shaft 3*d*1 into the axial hole 2*c*4 in the hub 2*c* under the biasing force of the spring 3*d*9.

Also, the chamfered portion 3*d*1*a* of the rotation shaft 3*d*1 is placed into engagement with the engagement portion 2*d*2 of the position adjusting member 2*d*, holding it at the predetermined position, and the hub 2*c* is so positioned through the action of the annular engagement portion 2*c*2*a* engaging the engagement member 2*d*3*a* of the position adjusting member 2*d* as to dispose the center of the recording medium 2*b* in alignment with the central axis of rotation.

The hub 2*c* is properly positioned in the rotational direction through engagement of the rotation shaft 3*d*1 with the two orthogonal sides of the positioning hole 2*c*4*a* of the axial hole 2*c*4 caused by the rotation of the table 3*d*3.

Figure 8A:
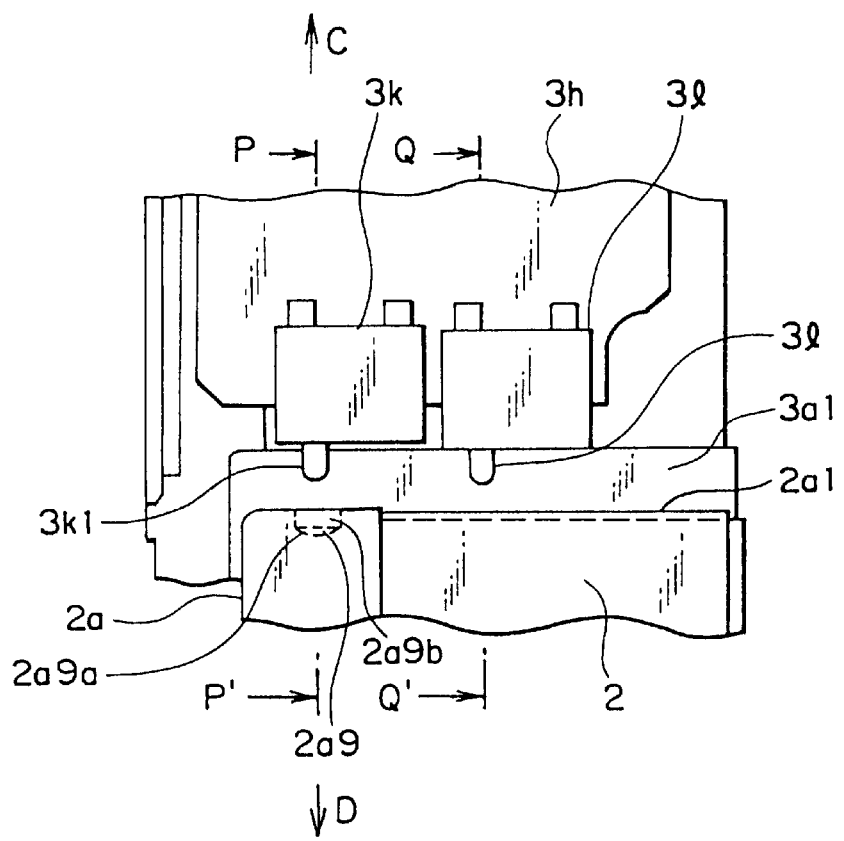
FIG. 8(a) is a partial view of the flexible recording system of FIGS. 1(a) and 1(b), showing a write-protect detector and a recording medium detector.
Figures 8B, 8C:
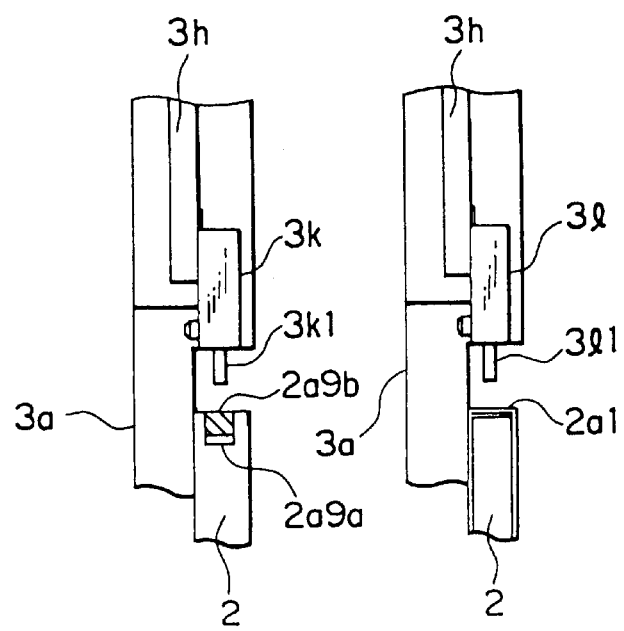
FIG. 8(b) is a cross-sectional view taken along line PP' of FIG. 8(a)
FIG. 8(c) is a cross-sectional view taken along line QQ' of FIG. 8(a)
Figure 9:
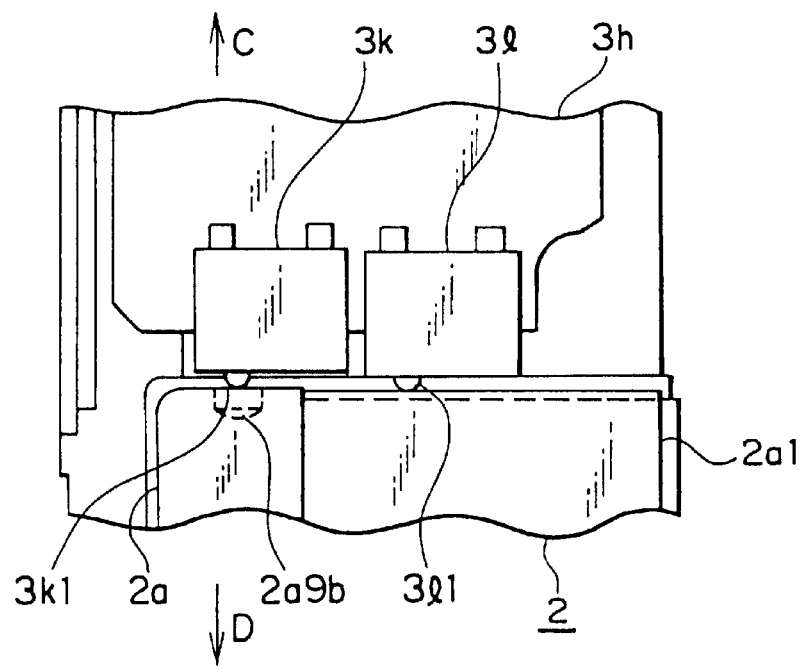
FIG. 9 is a view similar to FIG. 8(a), but showing a different operating states of the write-protect detector and the recording medium detector.
Figure 10:
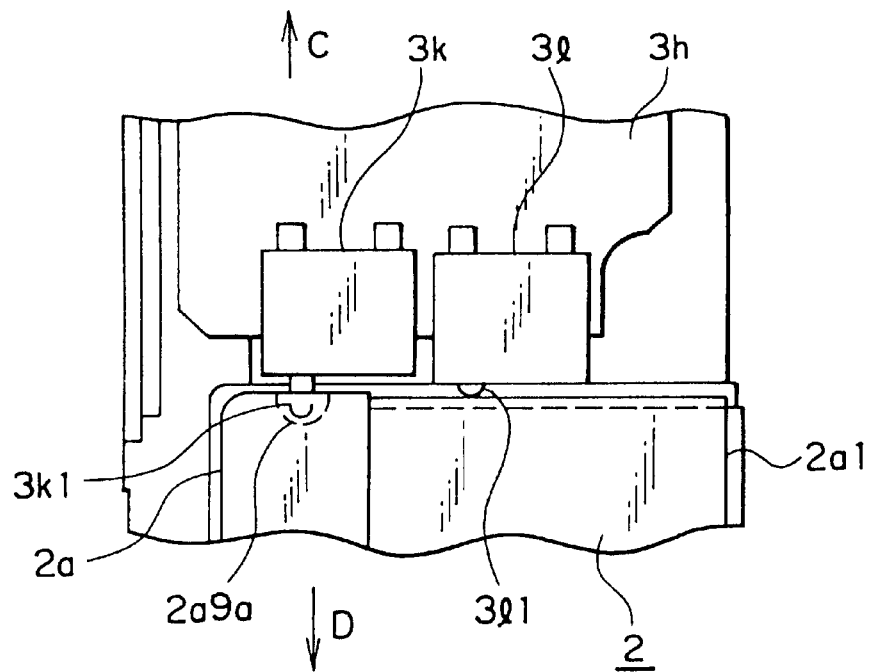
FIG. 10 is a view similar to FIG. 8(a), but showing another different operating states of the write-protect detector and the recording medium detector.

Next, the operations of the write-protect detector 3*k* and the recording medium detector 31 during loading of the recording disk 2 will be described while referring to FIG. 8(*a*) through FIG. 10. FIGS. 8(*a*) through 8(*c*) show the write-protect detector 3*k* and the recording medium detector 31, wherein FIG. 8(*a*) shows an arrangement of the write-protect detector 3*k*, the recording medium detector 31 and the recording disk; FIG. 8(*b*) is a cross section taken along line PP' in FIG. (*a*); FIG. 8(*c*) is a cross section taken along line QQ' in FIG. (*a*). FIG. 9 shows one operating state of the write-protect detector 3*k* and the recording medium detector 31, and FIG. 10 shows another operating state of the write-protect detector 3*k* and the recording medium detector 31. In these figures, like or corresponding parts are identified by the same symbols as in FIGS. 1 through 7.

In FIGS. 8(*a*) through (*c*), in a state that the recording disk 2 has not yet been inserted to such a position as the loading direction C side end of the disk-mounting portion 3*a*1, the first detection pin 3*k*1 of the write-protect detector 3*k* and the second detection pin of the recording medium detector 31 are both protruded toward the unloading direction D.

Subsequently, when the recording disk 2 being inserted has reached the loading direction C side end of the disk mounting portion 3*a*1, the first detection pin 3*k*1 of the write-protect detector 3*k* is urged to move toward the loading direction C by means of the spacer 2*a*9*b* mounted in the aperture 2*a*9*a*, so that the first detection pin 3*k*1 comes into contact with the two terminals (not shown) of the write-protect detector 3*k* to thereby establish electrical connection between the two terminals. As a result, the write-protect detector 3*k* detects the depression or push-down of the first detection pin 3*k*1 and generates to the controller 3*h* a first detection signal indicative of permission of writing information into the recording medium 2*b*. In this connection, it is to be noted that in this first embodiment, permission of writing is defined as a condition that the spacer 2*a*9*b* is fitted in the aperture 2*a*9*a*, and the first detection pin 3*k*1 is pushed down by the spacer 2*a*9*b*.

Further, upon the recording disk 2 having been inserted to the loading direction C side end of the disk mounting portion 3a1, the second detection pin 3l1 of the recording medium detector 31 is pushed to move toward the loading direction C by means of the shutter 2a1 of the recording disk 2, so that the second detection pin 3l1 comes into contact with the two terminals (not shown) of the recording medium detector 31 to thereby establish electrical connection between the two terminals, as a consequence of which the recording medium detector 31 detects depression or push-down of the second detection pin 3l1 and generates to the controller 3h a second detection signal indicative of loading or mounting of the recording disk 2.

In the first embodiment, since the first and second detection pins 3k1, 3l1 are of the switch type in which upon depression of the pin 3k1 or 3l1, it comes into contact with the unillustrated two terminals of the write-protect detector 3k or recording medium detector 31 to thereby establish electrical connection therebetween, it is possible to avoid or suppress contact failure due to wearing in an effective manner.

Moreover, as shown in FIG. 10, with the spacer 2a9b being not fitted in the aperture 2a9a, the first detection pin 3k1 is not pushed and remains projected, so the write-protect detector 3k generates no detection signal to the controller 3h. Thus, the controller 3h does not make the magnetic head 3e record information into the recording medium 2b and/or erase the information recorded therein.

Although in the first embodiment, the write-protect detector 3k and the recording medium detector 31 are formed separately from each other, they may instead be combined or integrated into each other. In this figure, like or corresponding parts are identified by the same symbols as in FIGS. 8 through 10.

Figure 11:
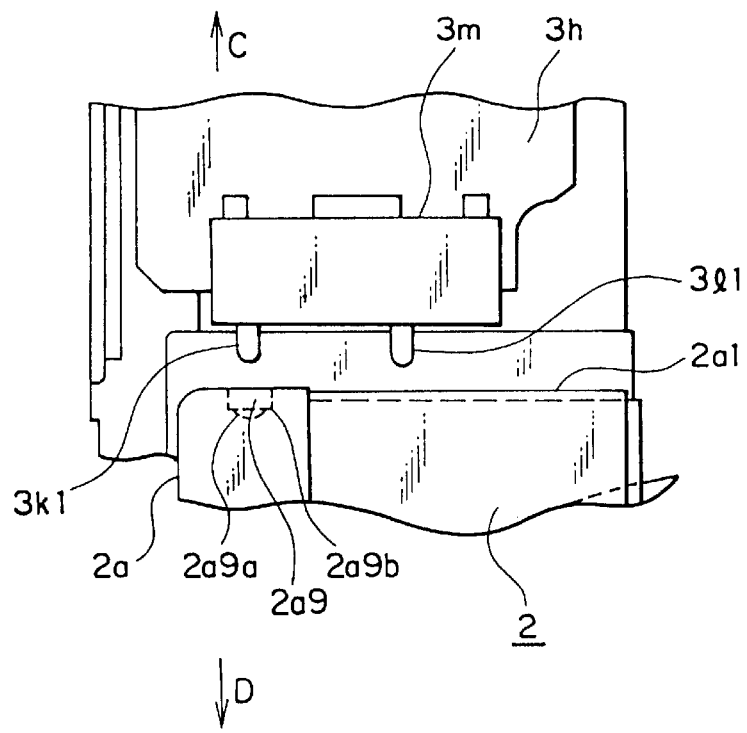
FIG. 11 is a view similar to FIG. 8(a), but showing modifications of a write-protect detector and a recording medium detector according to the present invention.

FIG. 11 shows a modified form of the write-protect detector 3k and the recording medium detector 31 according to the invention. In this figure, a detector 3m is provided on the loading direction C side end of the disk mounting portion 3a1 for detecting whether recording and erasing of information into or from the recording medium 2b are possible, and at the same time, whether the recording medium 2b is present or absent. The detector 3m has the write-protect detector 3k and the recording medium detector 31 formed integrally into a single housing.

According to this embodiment, such an integral construction of the write-protect detector 3k and the recording medium detector 31 can reduce the number of parts or components required and simplify the assembling work.

As described in the foregoing, according to the flexible recording system 1 of the first embodiment of the present invention, the hub 2c of the record;ng disk 2 fixedly secured to the recording medium 2b can protrude outwardly of the recording medium cartridge 2a, and the disk mounting portion 3a1 of the FDD 3 is provided adjacent the insertion opening of the recording disk 2 in the inserting or loading direction C, and the rotation shaft 3d1 of the recording medium drive motor 3d is movable in e thickness direction of the FDD 3, i.e., in the direction B or E. With this arrangement, the recording disk 2 can be mounted or loaded into the disk mounting portion 3a1, thus making it possible to reduce the thickness of the FDD 3.

Furthermore, the rotation shaft 3d1, being of the cylindrical configuration, can be fitted or engaged into the positioning hole 2a4 in the hub 2c in a reliable manner, thereby stabilizing the rotation of the recording medium 2b.

Still further, the recording disk 2 has the aperture 2a9a and the spacer 2a9b removably fitted therein, and the write-protect instructing member 2a9 indicative of the permission or inhibition of recording information into the recording medium 2b and erasing the information recorded therein is provided on the loading direction C (i.e., the inserting direction of the recording disk 2) side end face of the recording medium cartridge 2a. On the loading direction C side end of the disk mounting portion 3a1 of the FDD 3, there are provided the write-protect detector 3k with the first detection pin 3k1 and the recording medium detector 31 with the second detection pin 3l1. The first detection pin 3k1 is movable in the loading direction C and protruded in the unloading direction D, so that the write-protect detector 3k can detect the content of instructions of the write-protect instructing member 2a9 based on whether the first detection pin 3k1 is pushed down by the spacer 2a9b The second detection pin 3l1 is movable in the loading direction C and protruded in the unloading direction D, so that the recording medium detector 31 can detect the presence or absence of the recording disk 2 based on whether the second detection pin 3l1 is pushed down by the recording disk 2. With this arrangement, it is possible to detect the write protection or permission anchor the presence or absence of the recording disk 2 with a simple construction of the inventive system as compared with the aforementioned conventional system.

In addition, since the write protection or permission and/or the presence or absence of the recording disk 2 is detected based on whether the first or second detection pin 3k1 or 3l1 is pushed down, such a problem encountered with the aforementioned conventional system can be obviated that normal or correct detection will become difficult due to contact failure resulting from wearing. This serves to improve reliability of the inventive system to a substantial extent.

Figure 18:
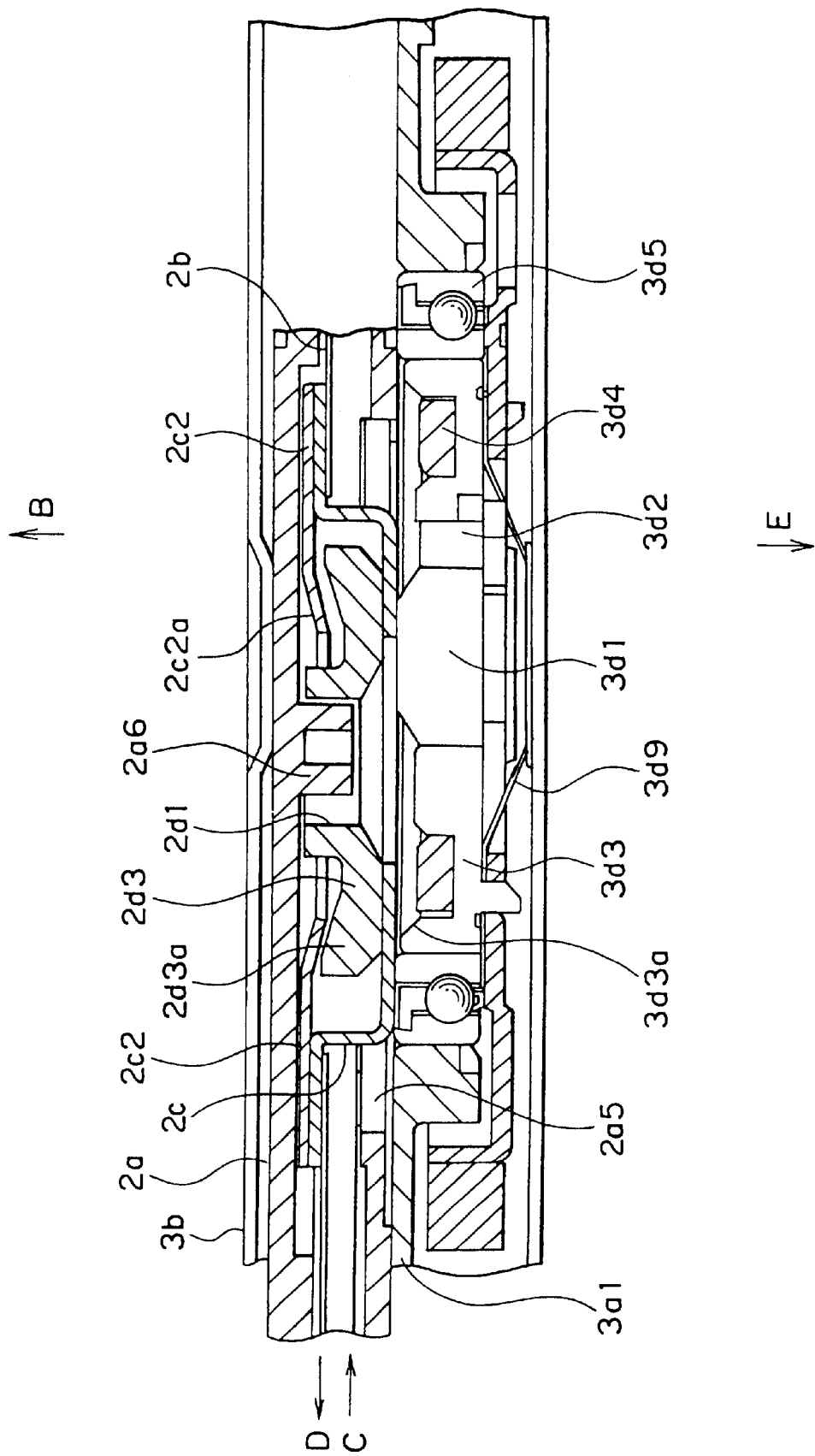
FIG. 18 is a cross-sectional view of the flexible recording system of FIGS. 1(a) and 1(b), showing the recording disk before chucked.

Now, a chucking operation upon inserting the recording disk 2 will be described. When the recording disk 2 is inserted into the FDD 3, the support shaft 2a6 comes into abutting engagement with the cylindrical portion 2d1 of the position adjusting member 2d to displace the position adjusting member 2d in the inserting or loading direction C, as shown in FIG. 18. As a result, the annular engagement portion 2d3a of the position adjusting member 2d is placed into abutment with the annular engagement portion 2c2a of the hub 2c to displace the hub 2c toward the loading direction C, whereby the hub 2c comes into abutment with the distal end of the rotation shaft 3d1, thus causing the rotation shaft 3d1 to move in the direction E against the biasing force of the spring 3d9. In this manner, the recording disk 2 can be further moved toward the loading direction C.

Figure 19:
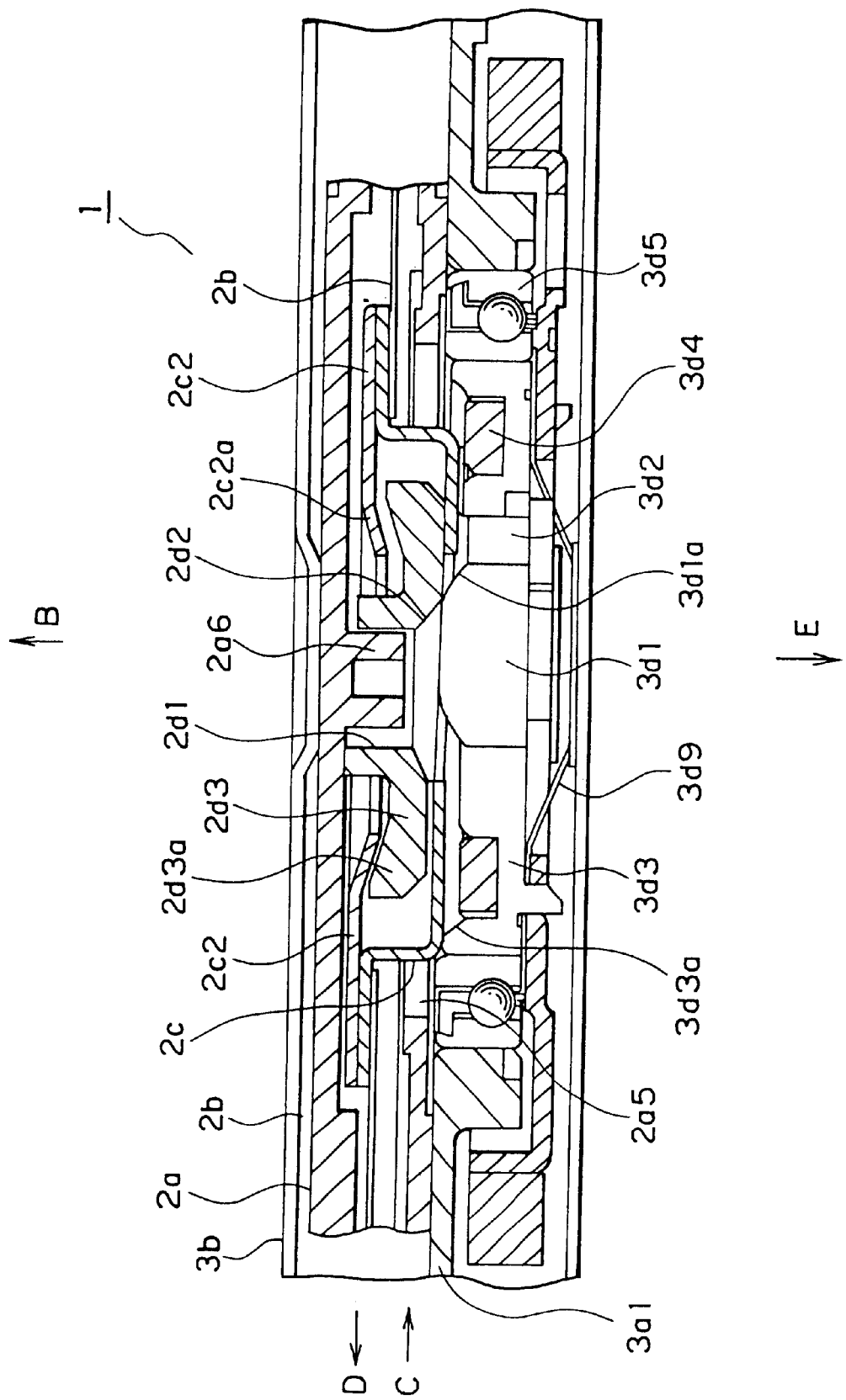
FIG. 19 is a view similar to FIG. 18, but showing an engaged state of a rotation shaft and an engagement portion of FIGS. 1(a) and 1(b)

Subsequently, when the recording disk 2 has been inserted to such a position that the axial hole 2c4 in the hub 2c is in opposition to the rotation shaft 3d1, the rotation shaft 3d1 is forced to move in the direction B under the biasing force of the spring 3d9, inserting the distal end thereof into the axial hole 2c4 and abutting against the position adjusting member 2d to thereby urge it in the direction B, as shown in FIG. 19. At this time, the magnet 3d4 magnetically attracts the surface 2c1 of the hub 2c, displacing the hub 2c in the direction E to place the table 3d3 of the recording-medium drive motor 3d into abutment with the surface 2c1. As a consequence, the engagement portion 2c2a of the engagement member 2c2 is moved in the direction E to engage the annular engagement portion 2d3a of the position adjusting member 2d.

Thereafter, as the recording disk 2 is further inserted, the chamfered portion 3d1a at the distal end of the rotation shaft 3d1 is placed into fitting engagement with the tapered annular engagement portion 2d2 of the position adjusting member 2d, whereby the position adjusting member 2d is held at the predetermined position. The engagement member 2c2 of the hub 2c is urged in the direction E under the magnetic attractive force of the magnet 3d4 to place the engagement portion 2c2a thereof into engagement with the cone-shaped engagement portion 2d3a of the position adjusting member 2d, which is held at the predetermined position against any movement, so that the position of the engagement member 2c2 is adjusted to position the center of the engagement portion 2c2a thereof at the axis of rotation. In this connection, it is to be noted that since the engagement portion 2c2a is disposed concentric with the recording medium 2b, the center of the recording medium 2b is positioned at the a as of rotation, i.e., the center of rotation thereof.

Then, the recording-medium drive motor 3d drives the table 3d3 to rotate to thereby bring the rotation shaft 3d1 into engagement with the two orthogonal sides of the positioning hole 2c4a, and the drive pin 3d2 into engagement with the drive hole 2c4b, thus positioning the hub 2c in its rotational direction at a predetermined location. The drive pin 3d2 can effectively transmit the rotational force of the recording-medium drive motor 3d to the recording medium 2b, so the recording-medium drive motor 3d can rotate the recording medium 2b in a most efficient manner.

Figure 28:
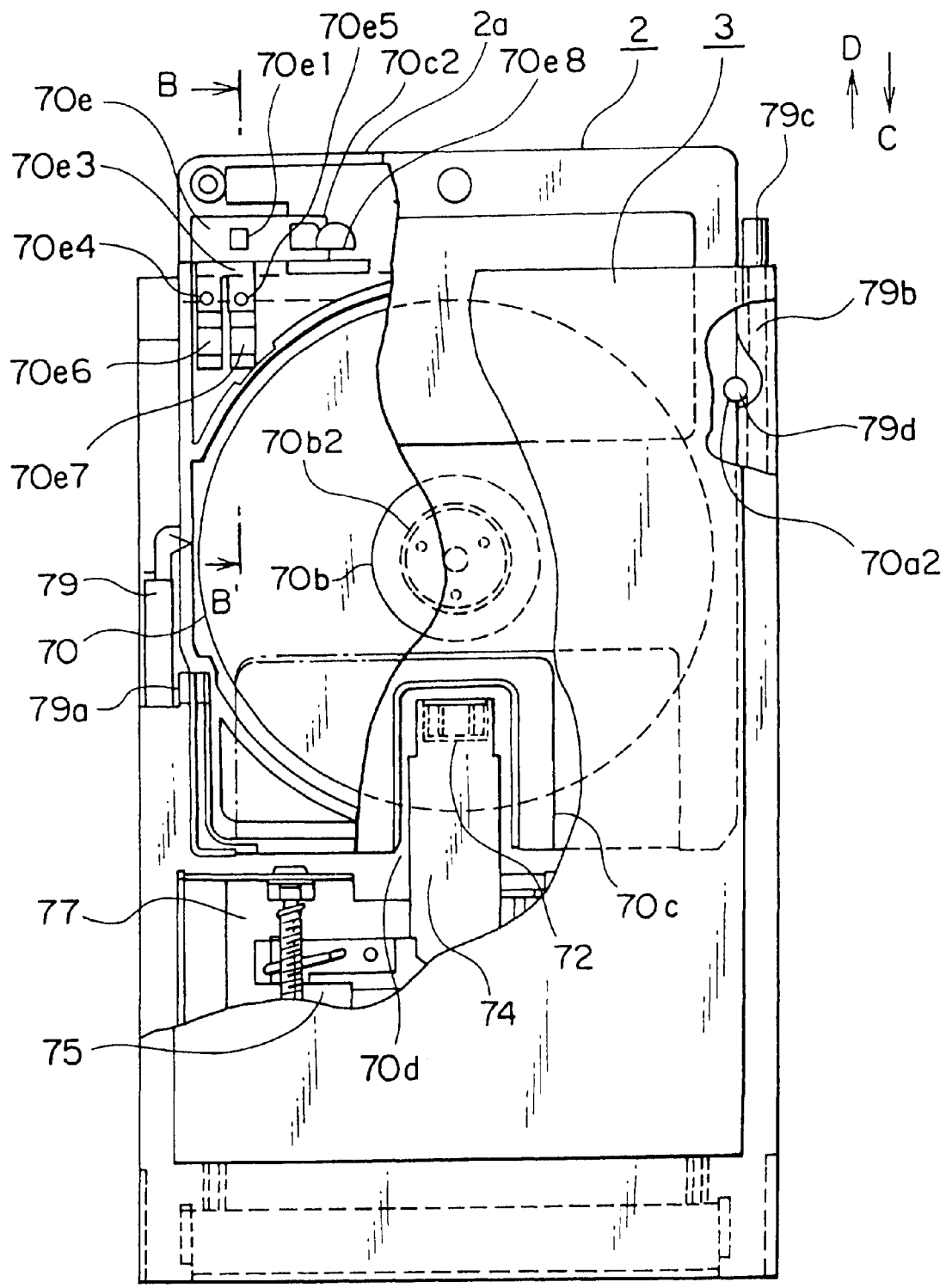
FIG. 28 is a partially broken plan view of the flexible recording system of FIG. 26 with the recording disk loaded in the flexible disk drive.
Figure 29:
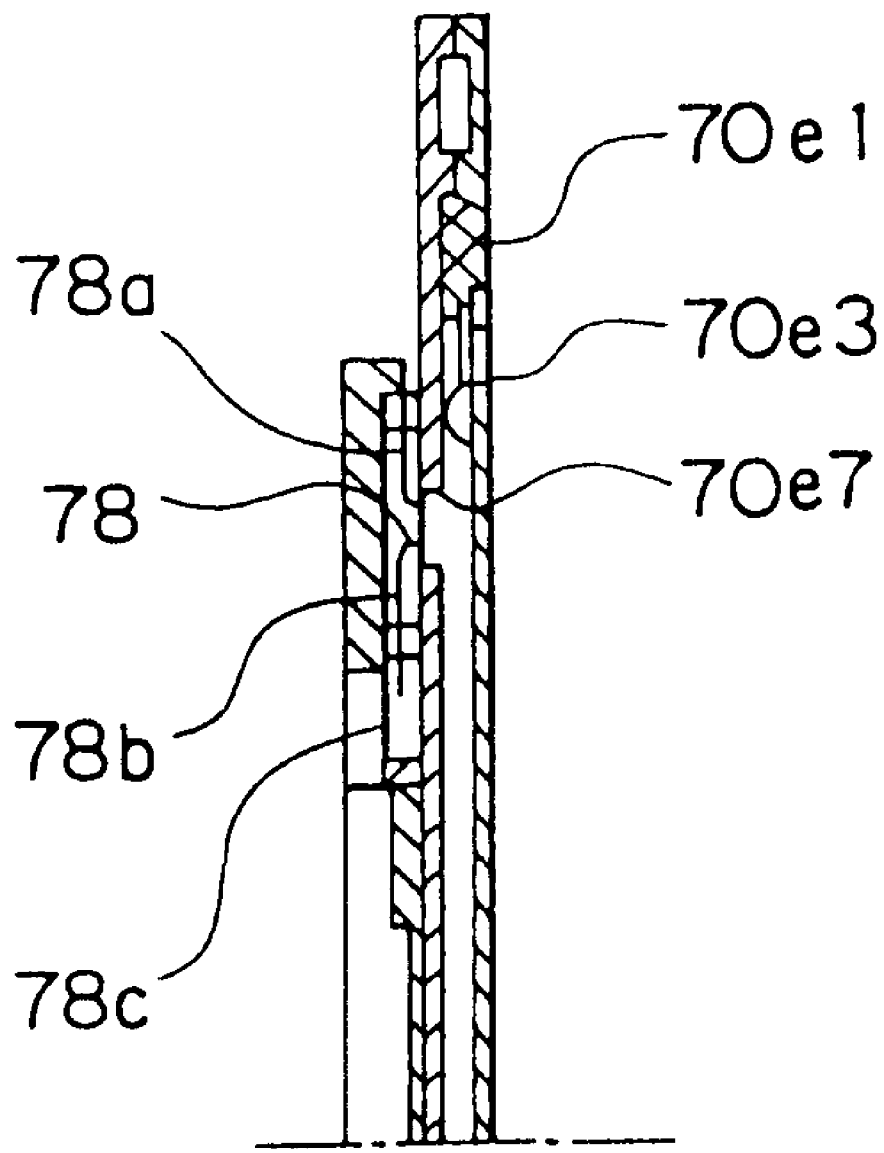
FIG. 29 is a cross-sectional view taken along line BB' of FIG. 28.

Specifically, with the inventive FDD 3, the recording disk 2, upon its mounting on the FDD 3, is not made to displace in the direction B or E as required with the aforementioned conventional FDD 51 shown in FIG 28, and hence the dimension in the thickness direction of the FDD 3 can accordingly be reduced, thus realizing miniaturization or thinning thereof.

Next, an ejecting operation of the recording disk 2 will be described. As illustrated in FIG. 6, when one pushes down the eject button 3c in the loading direction C with the recording disk 2 mounted or loaded in the FDD 3, the shaft 3j4 is displaced toward the loading direction C against the baising force of the spring 3j5.

Furthermore, when the eject button 3c is pushed down to such an extent that the recess 3j4a in the shaft 3j4 comes in opposition to the pin 3j7b of the stop 3j7, as illustrated in FIG. 7, the stop 3j7 is forced to rotate in the direction L so that the pin 3j7b is received in the recess 3j4a. That is, the recording disk 2 when mounted in the FDD 3 is subjected to the biasing force of the spring 3j3 acting In the electing or unloading direction D via the pawl 3j2a of the recording-medium ejection member 3j2, and thus is always thereby urged in the ejecting direction D, so the arcuate recess 2a3 in the recording-medium cartridge 2a always urges the stop 3j7 to rotate in the direction L. As a result, when it becomes possible for the pin 3j7b to be received in the recess 3j4a, the stop 3j7 is caused to rotate in the direction L, thus making the pin 3j7b received in the recess 3j4a.

In this manner, the recording disk 2 is released from the positioned state. and moved in the ejecting direction D under the action of the biasing force of the spring 3j3 through the recording-medium ejection member 3j2.

Upon movement of the recording disk 2 in the ejecting direction D, the urging force of the recording-medium cartridge 2a acting on the latch pin 3j6c in the inserting or loading direction C is released, and the latch limiting plate 3j6b is caused to rotate in the direction H by means of the spring 3j6e, whereby the latch pin 3j6c is placed into abutment with the unloading direction D side end of the elongated hole 3j6d, thus pushing the latch pawl 3j6a in the direction I. Consequently, the latch pawl 3j6a is caused to rotate in the direction I by means of the latch pin 3j6c to engage in the notch 3j4c in the shaft 3j4, thereby limiting the movement of the shaft 3j4, as shown in FIG. 5.

Figure 21:
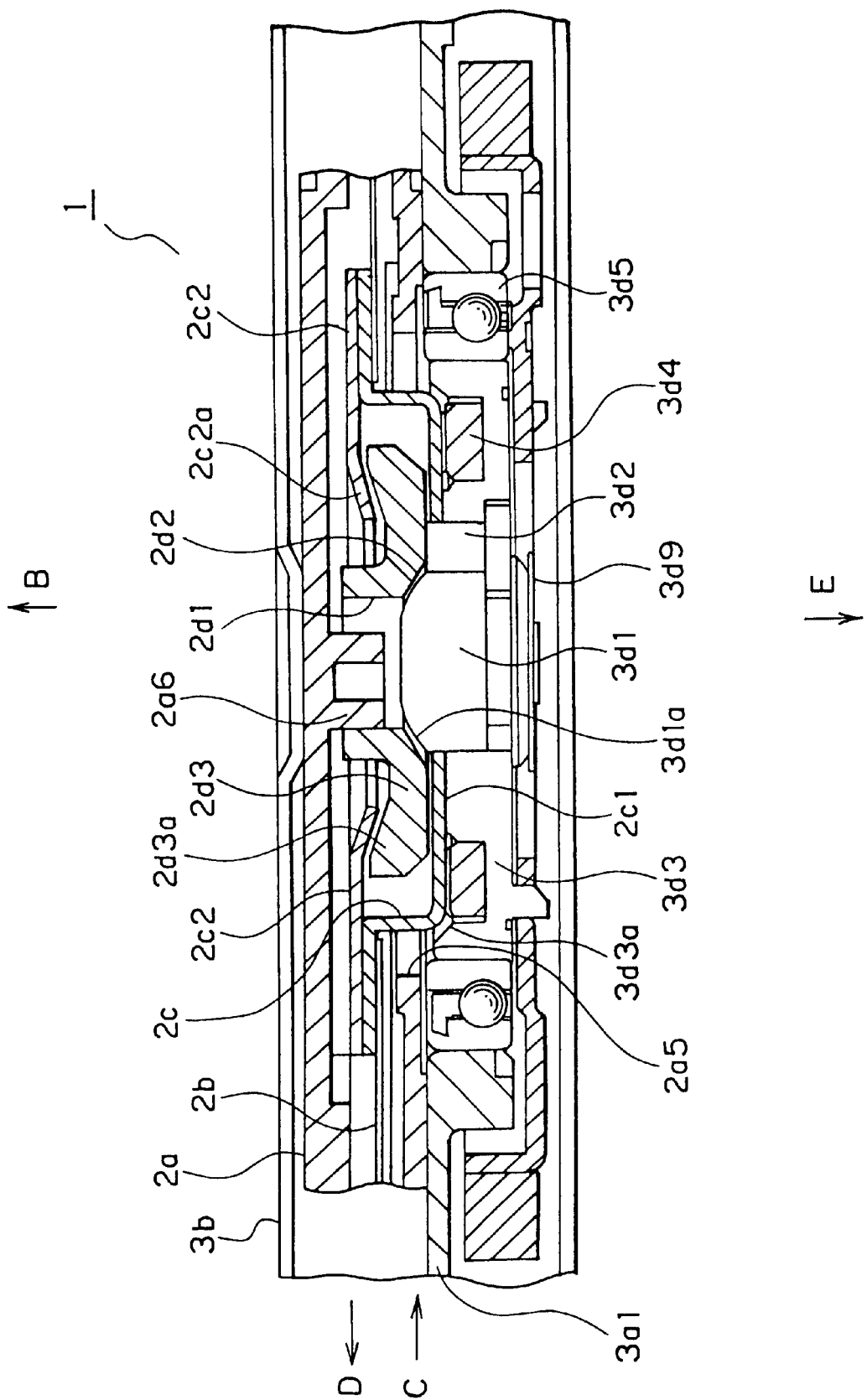
FIG. 21 is a cross-sectional view of the flexible recording system of FIGS. 1(a) and 1(b), showing the recording disk at the start of an unchucking operation.
Figure 22:
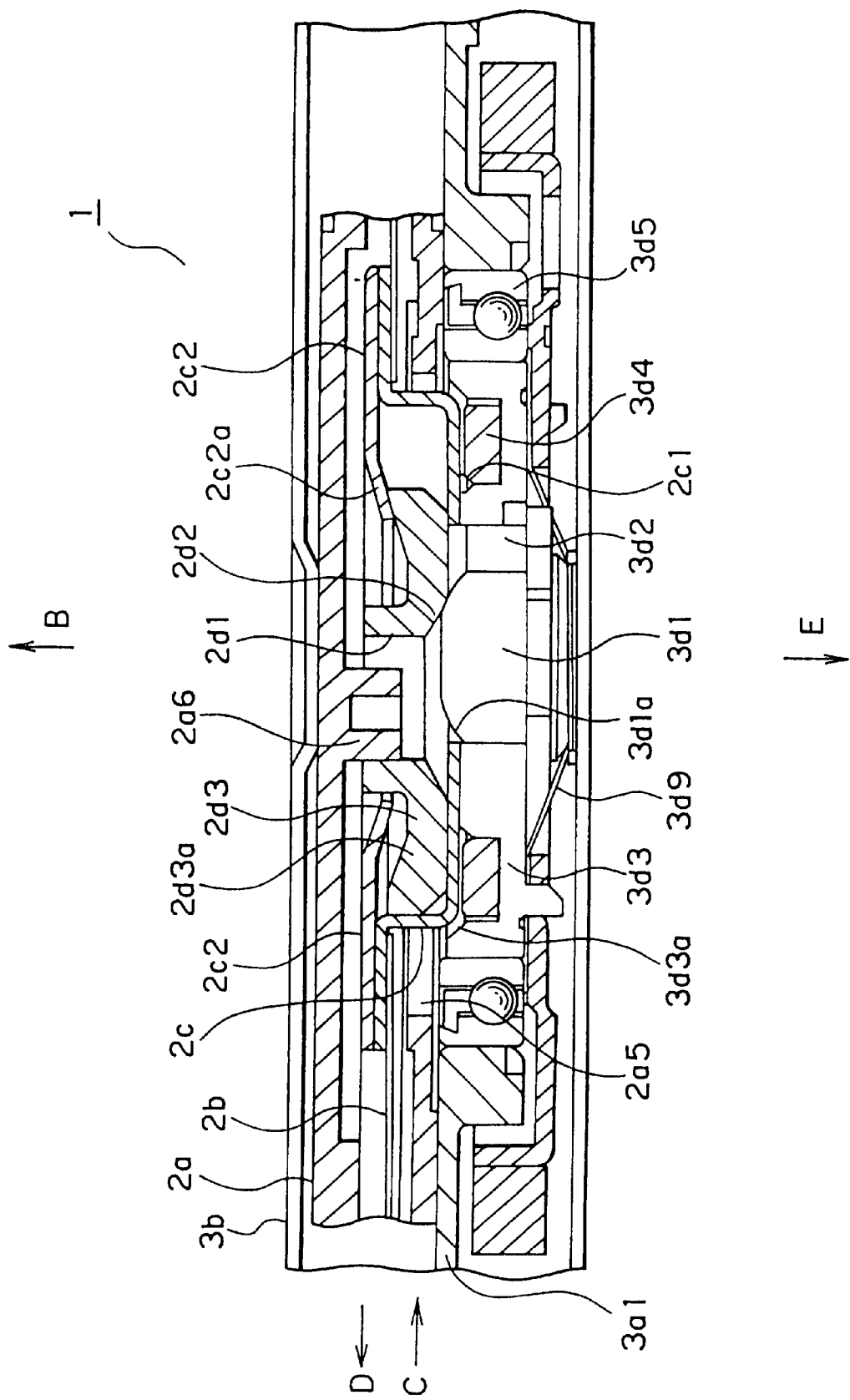
FIG. 22 is a view similar to FIG. 18, but showing a disengaged state of a rotation shaft and an engagement portion of FIGS. 1(a) and 1(b)
Figure 23:
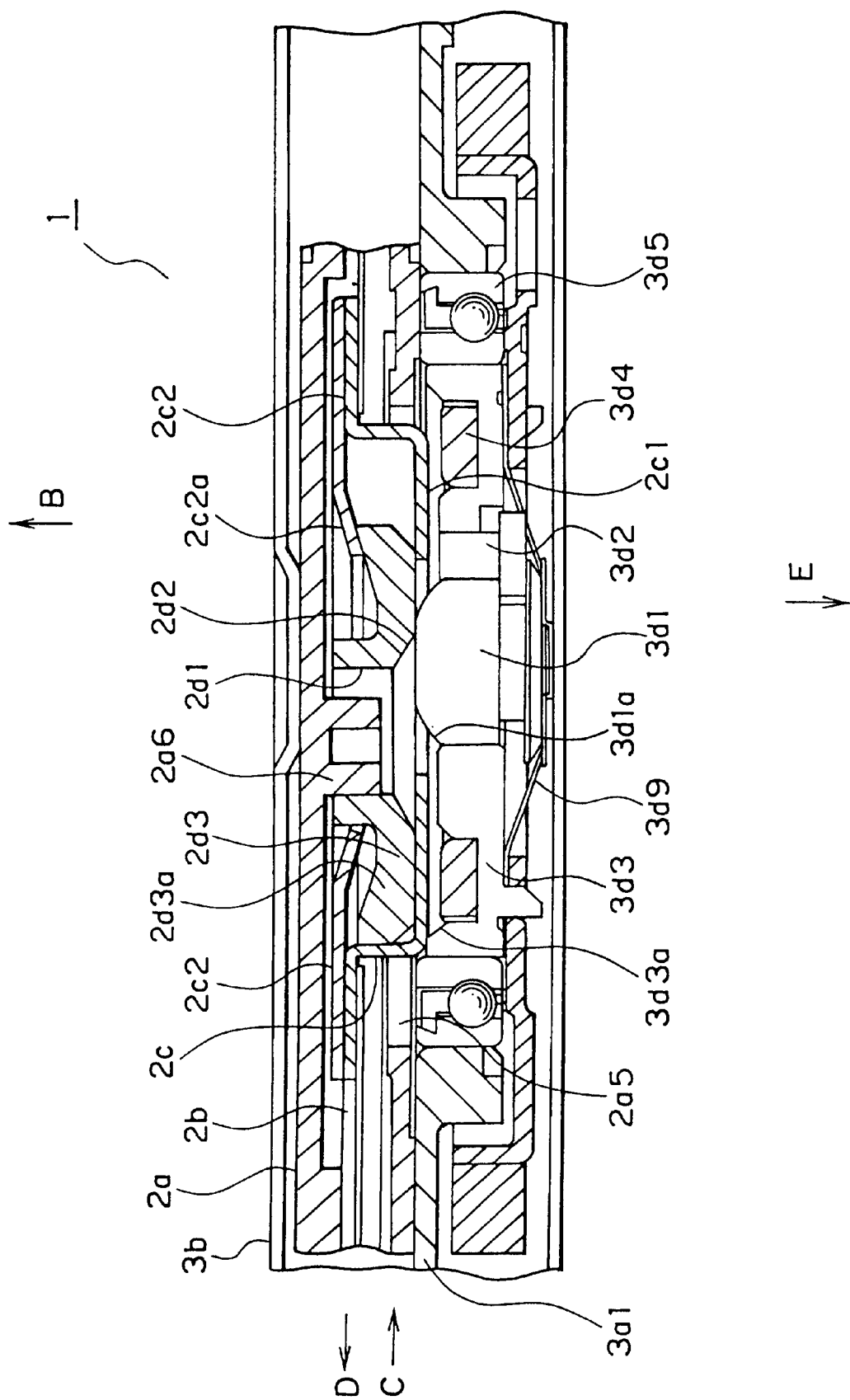
FIG. 23 is a cross-sectional view of the flexible recording system of FIGS. 1(a) and 1(b), showing the recording disk after unchucked.
Figure 24:
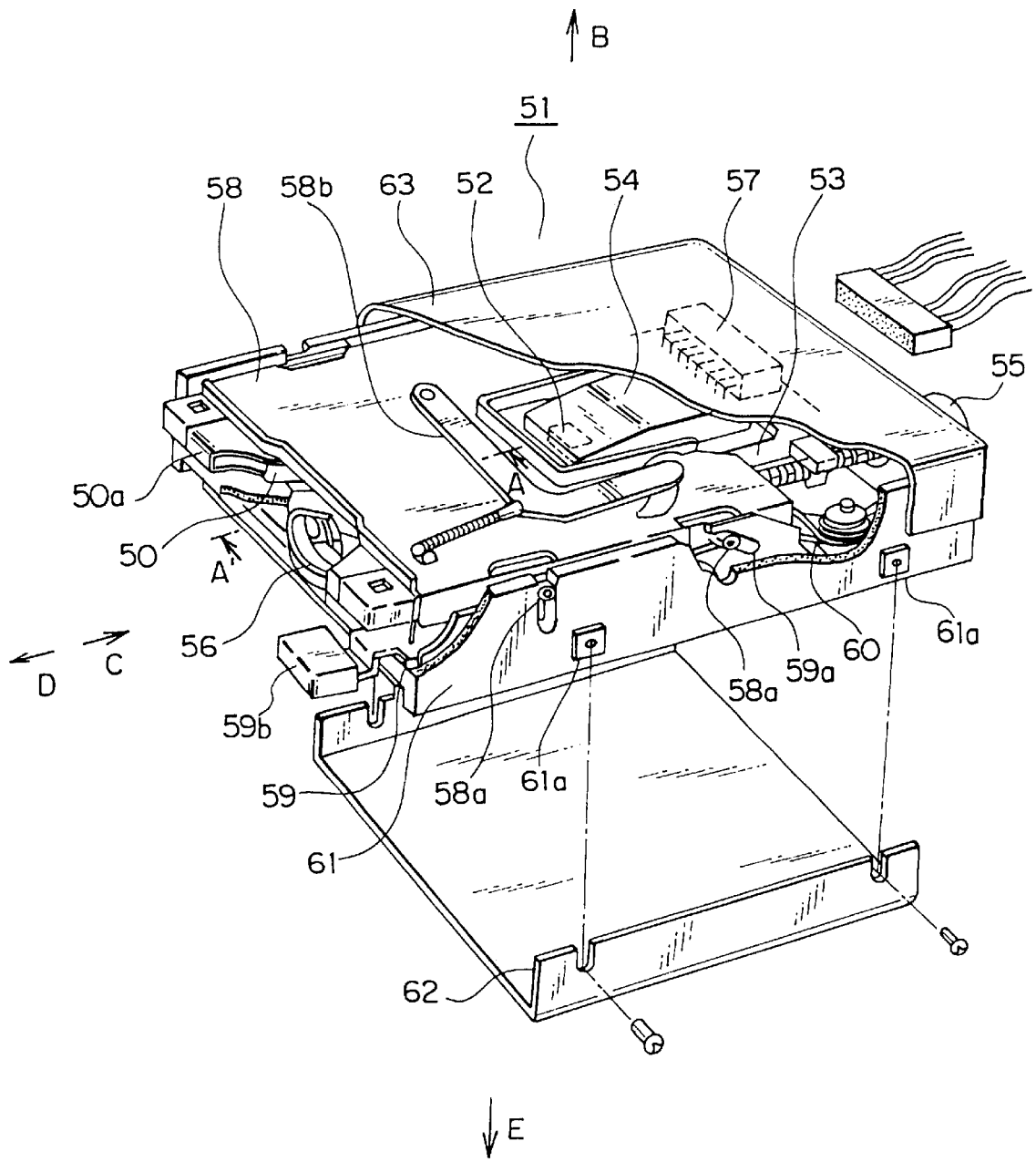
FIG. 24 is a partially broken fragmentary perspective view of a conventional flexible recording system.
Figure 25:
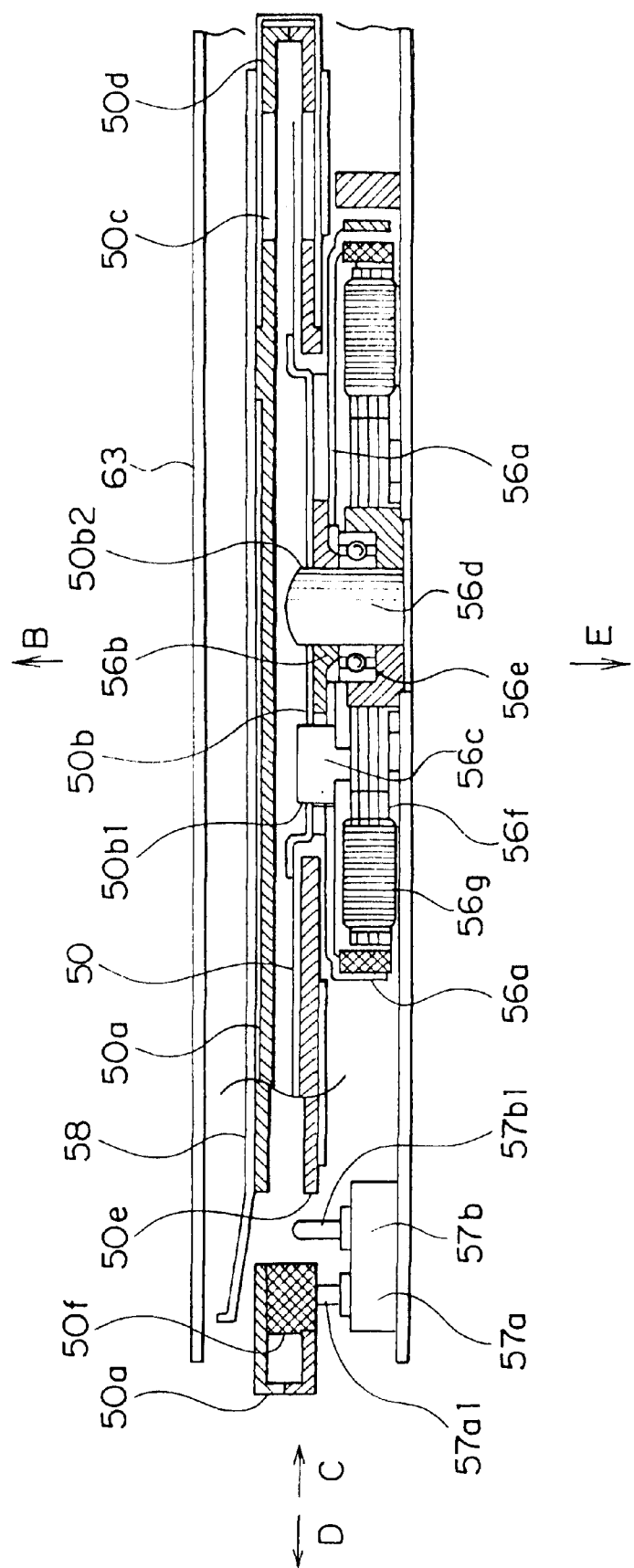
FIG. 25 is a cross-sectional view taken along line AA' of FIG. 24.
Figure 26:
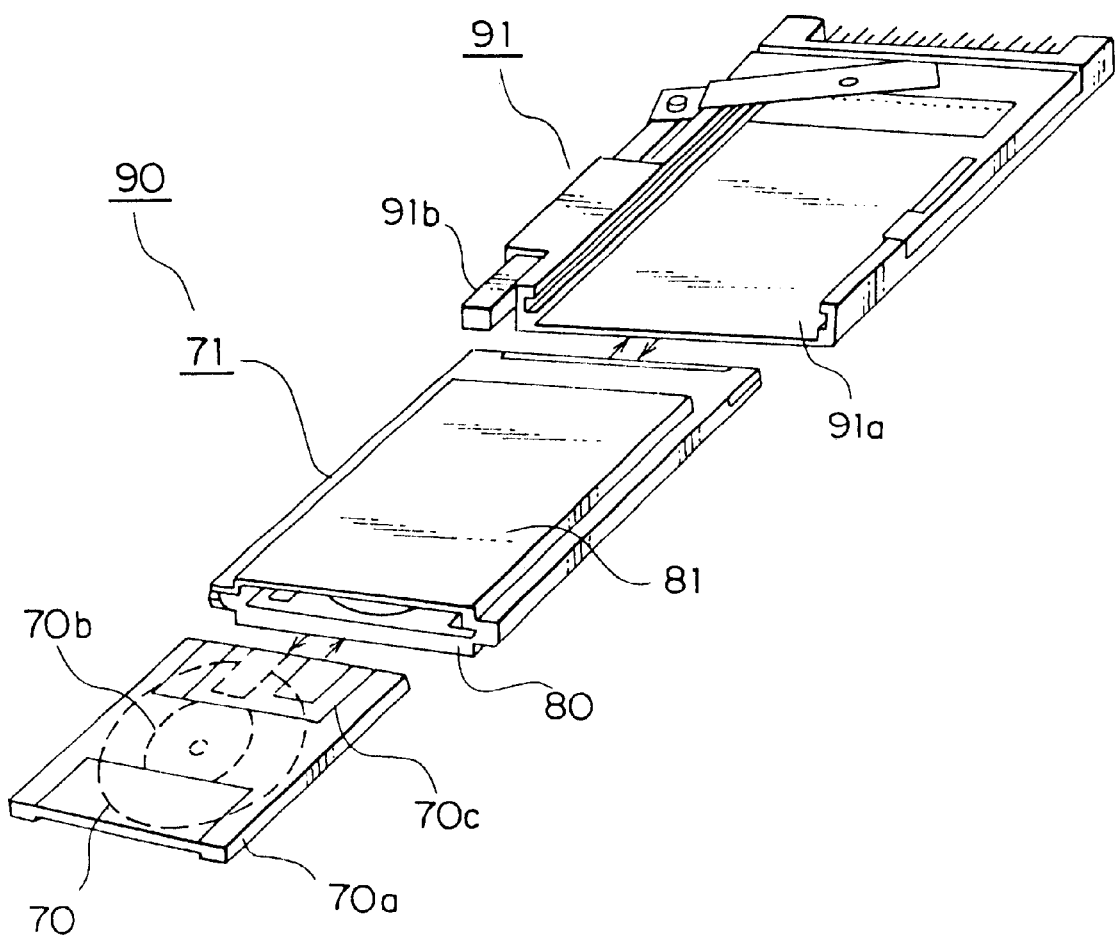
FIG. 26 is a fragmentary perspective view of another conventional flexible recording system.
Figure 27:
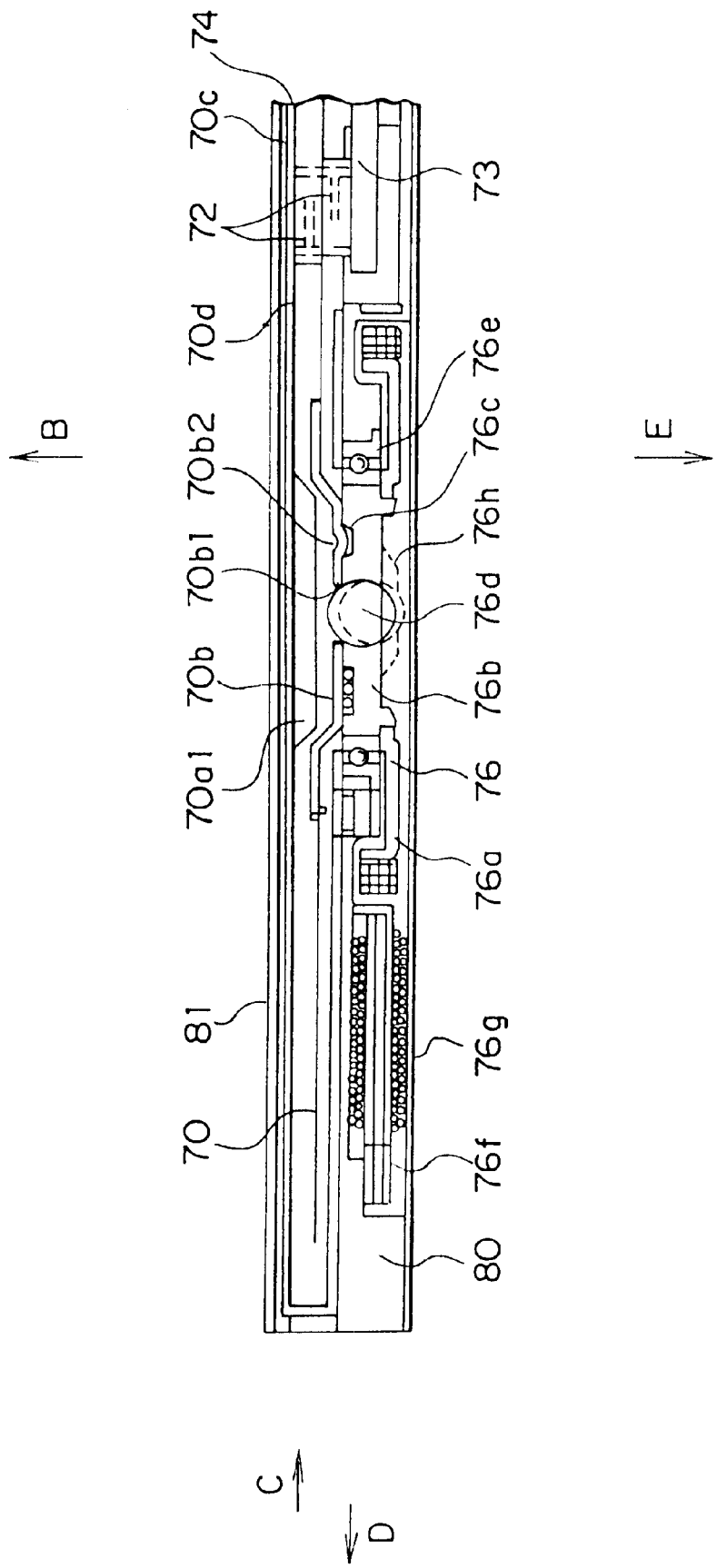
FIG. 27 is a cross-sectional side view taken along a center line of FIG. 26 with a recording disk loaded in a flexible disk drive.

Next, an unchucking operation of the recording disk 2 and the recording-medium drive motor 3d upon ejection or unloading of the recording disk 2 will be described while referring to FIGS. 21 through 23. FIG. 21 shows the state of the recording disk 2 and the recording-medium drive motor 3d at the time of starting an unchucking operation; FIG. 22 shows the state of the same upon releasing engagement between the rotation shaft 3d1 and the engagement portion 2c2a; FIG. 23 shows the state of the same after the unchucking operation. In these figures, like or corresponding parts are identified by the same symbols as in FIGS. 18 and 19.

Figure 20:
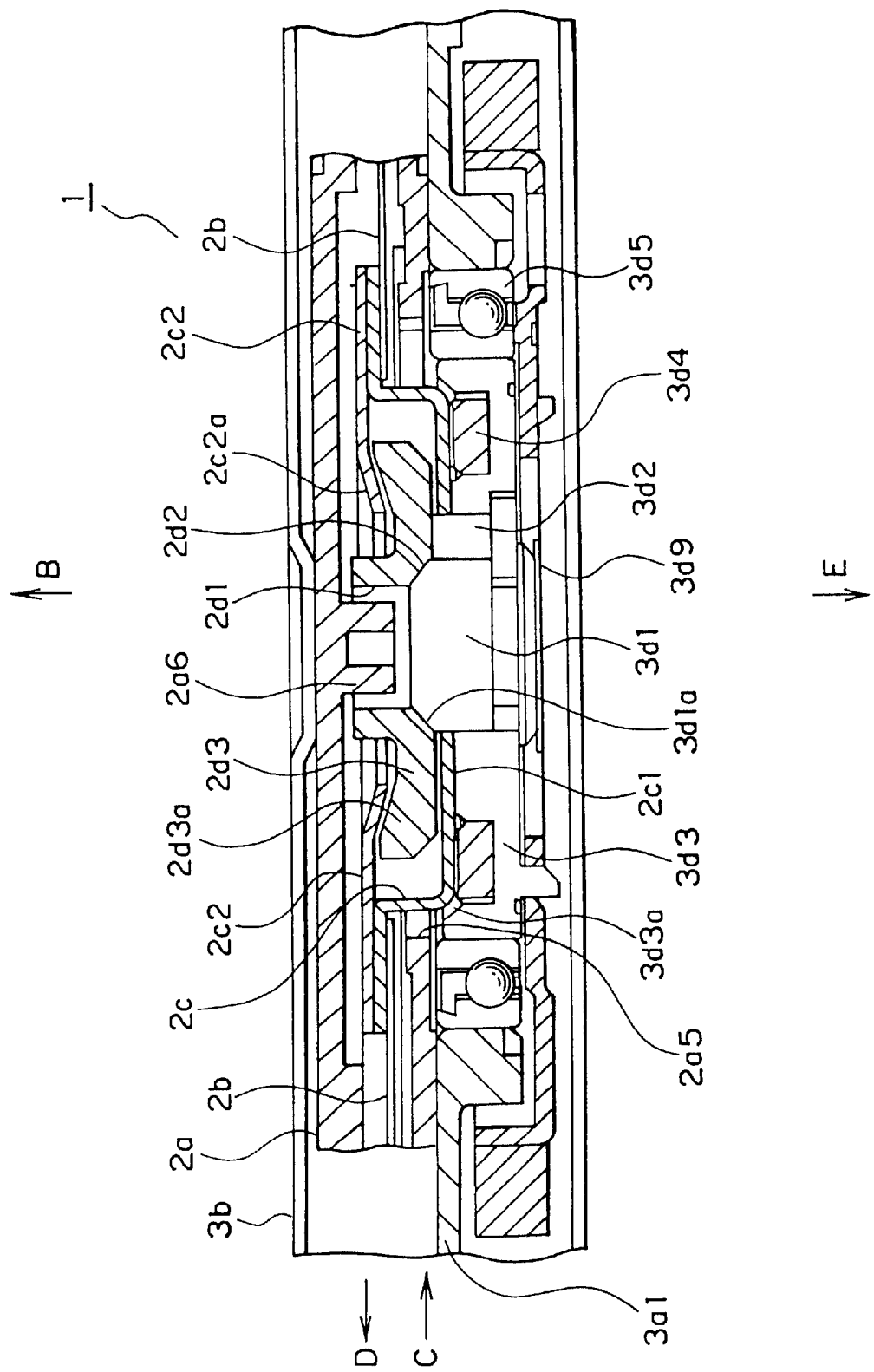
FIG. 20 is a cross-sectional view of the flexible recording system of FIGS. 1(a) and 1(b) showing the recording disk after chucked.

As shown in FIG. 20, when the recording-medium cartridge 2a has been released from its chucked state, i.e., when the pin 3j7b of the stop 3j7 has been received in the recess 3j4a so as to release the recording-medium cartridge 2a from its positioned state and permit its free movement toward the unloading direction D, as shown in FIG. 7, the recording-medium cartridge 2a is caused to move toward the unloading direction D under the biasing force of the spring 3j3 acting thereon through the pawl 3j2a, whereby the support shaft 2a6 comes into abutment with the inner wall of the cylindrical portion 2d1 of the position adjusting member 2d, urging the position adjusting member 2d toward the unloading direction D.

Thereafter, the position adjusting member 2d, being urged in the unloading direction D by means of the support shaft 2a6, displaces, through the intermediary of the tapered annular engagement portion 2d2, the rotation shaft 3d1 in the direction E against the biasing force of the spring 3d9, and at the same time is moved in the unloading direction D to ride on the distal end of the rotation shaft 3d1, thus releasing the engagement therebetween.

Upon further movement of the recording-medium cartridge 2a, the hub 2c moves in the unloading direction D as well as in the direction B under the guidance of the tapered hub-escaping portion 3d3a. That is, the attractive force of the magnet 3d4 magnetically attracting and holding the surface 2c1 thereto is strong in the axial direction B or in the direction E, but weak in the loading direction C or in the unloading direction D perpendicular to the axial direction B, so the hub 2c can easily separate from the magnet 3d4 under the guiding function of the tapered hube-scaping portion 3d3a.

Then, the recording disk 2 having the hub 2c received in the recording-medium cartridge 2a is moved in the unloading direction D with the lower surface of the recording-medium cartridge 2a being in flush with the surface 2c1 of the hub 2c.

As described above, according to the flexible recording system of the first embodiment, the system comprises the recording disk 2 and the flexible disk drive 3, and the recording disk 2 comprises the recording medium 2b, the hub 2c fixedly secured to the recording medium 2b and supported by the support shaft 2a6 for movement in a direction perpendicular to the recording surface of the recording medium 2b, the recording-medium cartridge 2a receiving therein the recording medium 2b and the hub 2c with the opening 2a5 through which the hub 2c can be protruded outwardly, and the flexible disk drive 3 comprises the magnetic head 3e for recording information into the recording medium 2b and reproducing the information recorded therein, the carriage mechanism 3f for moving the magnetic head 3e, the recording-medium drive motor 3d for driving the recording medium 2b to rotate while holding the hub 2c, and the frame 3a having the disk mounting portion 3a1 on which the recording disk 2 is adapted to be mounted The recording-medium drive motor 3d has the magnet 3d4 functioning as a drawing member for drawing or attracting the hub 2c, and acts to drive the recording medium 2b to rotate while holding the surface 2c1 of the hub 2c protruded from the opening 2a6 outwardly of the recording-medium cartridge 2a. With this arrangement, the recording medium 2b can be rotated by the recording-medium drive motor 3d, with the hub 2c to which the recording medium 2b is fixedly secured being protruded outwardly of the recording-medium cartridge 2a so as to be held by the recording-medium drive motor 3d. Thus, in order to hold and rotate the recording medium 2b, it is not necessary to move the recording disk 2 as a whole toward the recording-medium drive motor 3d, as a consequence of which the entire system can accordingly be formed compact or thin. Therefore, the thickness of the flexible disk drive 3 can be 5.0 mm like a memory card.

The recording-medium drive motor 3d is provided with the cylindrical rotation shaft 3d1 that has a predetermined length along the axis of rotation thereof and is adapted to be moved along that axis of rotation by means of the table 3d3, the rotation shaft 3d1 being displaced toward the recording disk 2 so as to be engaged in the positioning hole 2c4a of the axial hole 2c4 in the hub 2c. With this arrangement, chucking operation can be done smoothly. In addition, the engagement between the cylindrical rotation shaft 3d1 and the positioning hole 2c4a can ensure positive engagement between the rotation shaft 3d1 and the hub 2c, thereby suppressing fluctuations or variations in rotation of the recording disk 2. Also, with a simple arrangement that the rotation shaft 3d1 is urged toward the recording disk 2 by means of the spring 3d9, it is possible to realize reliable engagement between the rotation shaft 3d1 and the hub 2c.

Moreover, the provision of the drive pin 3d2 adapted to be engaged with the hub 2c for driving the recording medium 2b to rotate serves to utilize the driving force or torque of the recording-medium drive motor 3d in an efficient manner.

Still more, the arrangement that the rotation shaft 3d1 and the drive pin 3d2 are urged toward the recording disk 2 by means of one and the same spring 3d3 serves to reduce the number of components required, and make it possible to engage the rotation shaft 3d1 and the drive pin 3d2 with the hub 2c by use of a simple construction.

In addition, the hub 2c has the annular engagement portion 2c2a with its center placed on a central alas passing through the center of the recording medium 2b, and the reception chamber 2c3 defined between the engagement portion 2c2a and the surface 2c1 of the hub 2c. The recording disk 2 is provided with the position adjusting member 2d which is received in the reception chamber 2c3 and comprises the engagement portion 2d2 engageable with the rotation shaft 3d1 of the recording-medium drive motor 3d, and the engagement portion 2d3a engageable with the engagement portion 2c2a of the hub 2c so as to position the center of the engagement portion 2c2a at the axis of rotation of the recording disk 2. The position adjusting member 2d is positioned at a predetermined location of the rotation shaft 3d1 with the engagement portion 2d2 thereof fitted over the rotation shaft 3d1 while the center of the engagement portion 2c2a is positioned at the axis of rotation of the recording medium 2b by means of the engagement portion 2d3a. With this arrangement, the center of the recording medium 2b can be made as the axis of rotation thereof, thus reducing an amount of eccentricity therebetween and hence enhancing reliability in operation of the system.

Further, the rotation shaft 3d1 has the chamfered portion 3d1a formed at its one end near the recording disk 2, and the engagement portion 2d2 is formed into such a configuration as to match the chamfered portion 3d1a. With such a simple construction, it is possible to position the position adjusting member 2d at a predetermined location of the rotation shaft 3d1 without difficulty, so the center of the recording medium 2b, which is fixedly secured to the hub 2c having the engagement portion 2c2a thereof engaging the engagement portion 2d3a of the position adjusting member 2d, can easily be positioned at the axis of rotation of the recording-medium drive motor 3d.

According to the flexible recording system of the present invention, the recording medium drive motor 3d comprises the cylindrical rotation shaft 3d1 of a predetermined length along the axis of rotation thereof, and the table 3d3 supporting the rotation shaft 3d1 for movement along the axial direction thereof and having the magnet 3d4 for magnetically attracting the hub 2c of the recording medium 2b, wherein the hub 2c is magnetically attracted to the magnet 3d4 so as to be held protruded outwardly of the recording-medium cartridge 2a. With this arrangement, it is possible to rotate the recording medium 2b with the hub 2c of the recording medium 2b protruded outwardly of the recording-medium cartridge 2a, so there is no need for displacing the recording-medium cartridge 2a toward the recording-medium drive motor 3dfor the purpose of chucking the recording medium 2b, thus making it possible to reduce the overall size of the system or the thickness thereof. Also, since the cylindrical rotation shaft 3d1 is displaced toward the recording medium 2b so as to be engaged with the positioning hole 2c4a in the hub 2c, it is possible to secure engagement between the hub Zc and the rotation shaft 3d1 with high reliability, thus suppressing fluctuations or variations in the rotation of the recording medium 2b.

Moreover, the rotation shaft 3d1 of the recording-medium drive motor 3d is urged toward the recording disk 2 by means the spring 3d3, so the rotation shaft 3d1 can be engaged with the hub 2c by use of a simple construction. Further, the provision of the drive pin 3d2 engageable with the hub 2c for driving the recording medium 2b to rotate serves to utilize the driving force of the recording-medium drive motor 3d in an effective manner.

Still further, the rotation shaft 3d1 and the drive pin 3d2, being urged toward the recording disk 2 by means of one and the same spring 3d3, can reduce the number of components required, and bring the rotation shaft 3d1 and the drive pin 3d2 in engagement with the hub 2c by use of a simple construction.

According to the recording disk 2 of the first embodiment, the recording disk 2 comprises the disk-shaped recording medium 2b for magnetically recording information therein, the hub 2c fixedly secured to the recording medium 2b and supported by the support shaft 2a6 for movement in a direction perpendicular to the recording surface of the recording medium 2b, and the recording-medium cartridge 2a rotatably receiving therein the hub 2c and the recording medium 2b and having the opening 2a5 through which the hub 2c is protruded outwardly therefrom. With this arrangement. the recording medium 2b can be rotated with the hub 2c being protruded from the opening 2as outwardly of the recording-medium cartridge 2a and held or supported by the support shaft 2a6, as a consequence of which the recording disk 2 as a whole need not be displaced in the direction perpendicular to the recording surface thereof, thus enabling a reduction in the overall size or thickness of the system to which the recording medium 2b is mounted.

Furthermore, the recording disk 2 is provided with the position adjusting member 2d for adjusting the position of the recording medium 2b through the hub 2c so as to place the axis of rotation of the recording medium 2b being rotated by the recording-medium drive motor 3d substantially in coincidence with the center of the recording medium 2b. With this construction. the center of the recording medium 2b is positioned at the axis of rotation thereof, i.e., the center of rotation thereof, thus reducing an amount of eccentricity therebetween and enhancing the reliability in operation.

Further, the hub 2c of the recording disk 2 has the annular engagement portion 2c2a with its center placed on a central axis passing through the center of the recording medium 2b, and the reception chamber 2c3 defined between the engagement portion 2c2a and the surface 2c1 of the hub 2. The position adjusting member 2d is received in the reception chamber 2c3 and has the engagement portion 2d2 engageable with the rotation shaft 3d1 of the recording-medium drive motor 3d, and the engagement portion 2d3a engageable with the engagement portion 2c2a in such a manner as to position the center of the engagement portion 2c2a at the axis of rotation of the rotation shaft 3d1. The engagement portion 2d2 of the position adjusting member 2d is engaged with the rotation shaft 3d1 so as to be positioned at the predetermined location of the rotation shaft 3d1, so that the center of the recording medium 2b can be made as the axis of rotation thereof by use of a simple construction. As a result, the amount of eccentricity between the center of the rotation shaft 3d1 and the axis of rotation thereof is minimized to improve reliability in operation.

Additionally, the engagement portion 2c2a and the engagement portion 2d3a of the recording disk 2 have substantially the same diameter, and are formed into a cone-shaped configuration, so that the engagement portions 2c2a, 2d3a are moved relative to each other along the inclination of their cone-shaped surfaces so as to engage with each other at their predetermined engagement positions. Thus, the center of the recording medium 2b can be made as the axis of rotation thereof without difficulty, thereby minimizing the amount of eccentricity between the center of the rotation shaft 3d1 and the axis of rotation thereof for improved reliability in operation.

Embodiment 2

Figure 12:
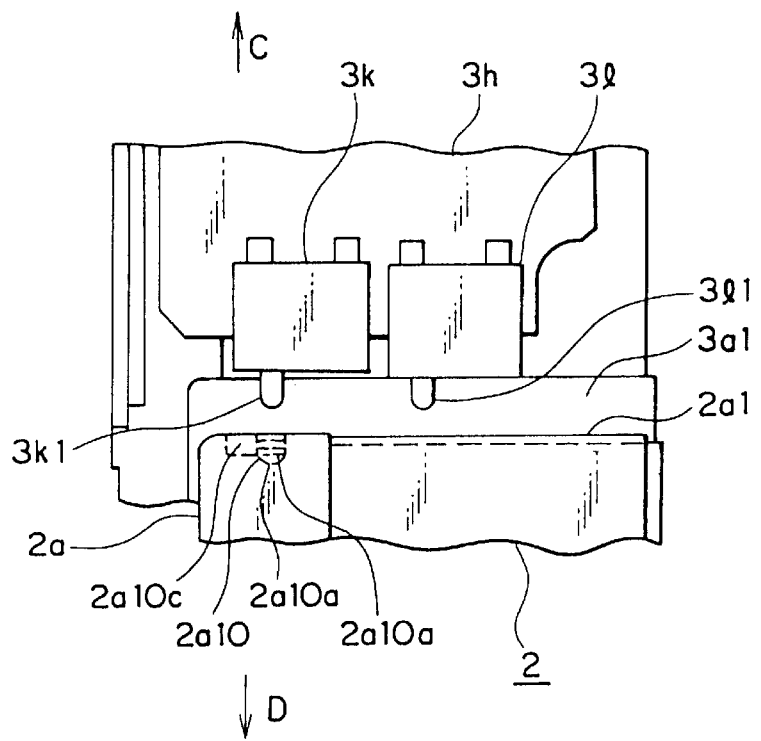
FIG. 12 is a view similar to FIG. 8(a), but showing a write-protect detector and a recording medium detector according to another embodiment of the invention.
Figure 13A:
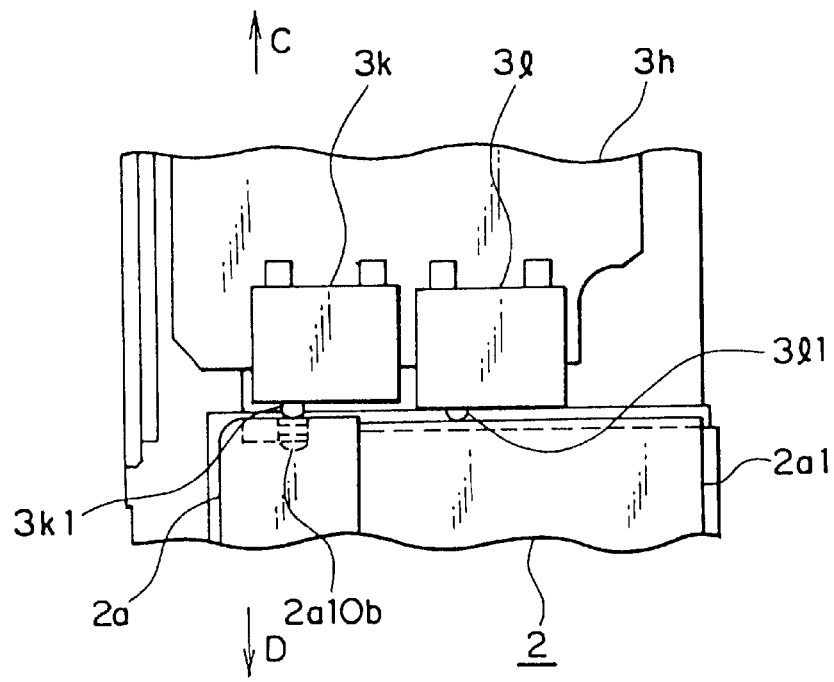
FIG. 13(a) is a view showing an operating state of the write-protect detector of FIG. 12, with a hole being closed.
Figure 13B:
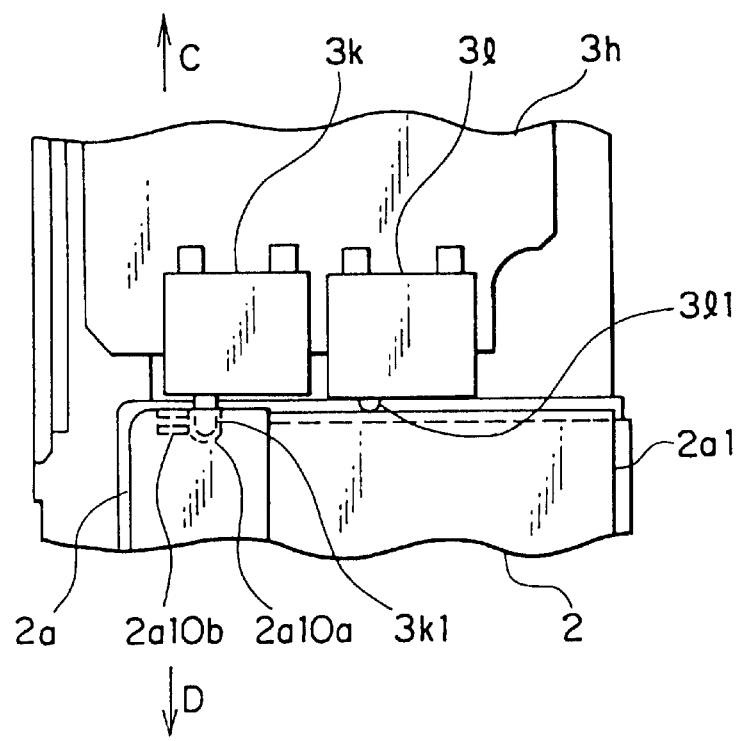
FIG. 13(b) is a view showing another operating state of the write-protect detector of FIG. 12, with a hole being opened.

FIGS. 12 and 13 shows a flexible recording system according to a second embodiment of the present invention. FIG. 12 shows a write-protect instructing member and a first detection member according to this embodiment, and FIG. 13(a) and 13(b) show different operating states thereof. In these figures, like or corresponding parts are identified by the same symbols as in FIGS. 8 through 11.

A write-protect instructing member 2a10 of a recording medium cartridge 2a has an aperture or cavity 2a10a formed in a loading direction C side end face of the recording medium cartridge 2a, a lid 2a10b for opening and dosing the aperture 2a10a, and a withdrawal portion 2a10c supporting the lid 2a10b for sliding movement along the end face of the recording medium cartridge 2a and withdrawing the lid 2a10b therein when the aperture 2a10a is opened.

In the second embodiment in a state where the recording disk 2 being inserted has not yet reached the loading direction C side end of the disk mounting member 3a1, the first detection pin 3k1 of the write-protect detector 3k and the second detection pin 3l1 of the recording medium detector 31 are both protruded toward the unloading direction D, as shown in FIG. 8.

Subsequenty, when the recording disk 2 has further inserted to reach the loading direction C side end of the disk mounting member 3a1, as shown in FIG. 13(a), the first detection pin 3k1 of the write-protect detector 3k is pushed down to move toward the loading direction C by means of the lid 2a10b which closes the aperture 2a10a. As a result, the write-protect detector 3k detects this movement of the first detection pin 3k1 and generates to a controller 3h a first detection signal indicative of permission of writing information into the recording medium 2b. Here, note that in this second embodiment, the permission of writing is defined as a condition that the first detection pin 3k1 is pushed down by the lid 2a10b.

Upon the recording disk 2 having been inserted to the loading direction C side end of the disk mounting member 3a1, the second detection pin 3l1 of the recording medium detector 31 is pushed down to move toward the loading direction C by means of the recording disk 2. The recording medium detector 31 detects this movement of the second detection pin 3l1 and generates to the controller 3h a second detection signal indicative of the loading or mounting of the recording disk 2.

As shown in FIG. 13(b), in a state where the lid 2a10b is slid to the withdrawal portion 2a10c to open the aperture 2a10a, the first detection pin 3k1 is not pushed down and remains projected, and hence the write-protect detector 3k generates no detection signal to the controller 3h, so that the controller 3h does not make the magnetic head 3e record information into the recording medium 2b or erase the information recorded therein.

According to the write-protect Instructing member 2a10 of the second embodiment, there will be obtained substantially the same advantages as in the write-protect instructing member 2a9 of the aforementioned first embodiment, and in addition, due to the provision of the lid 2a10b for opening and dosing the aperture 2a10a and of the withdrawal portion 2a10c for withdrawing the lid 2a10b upon opening the aperture 2a10a, the lid 2a10b is prevented from being lost, and thus improved in its utility.

Embodiment 3

Figure 14A:
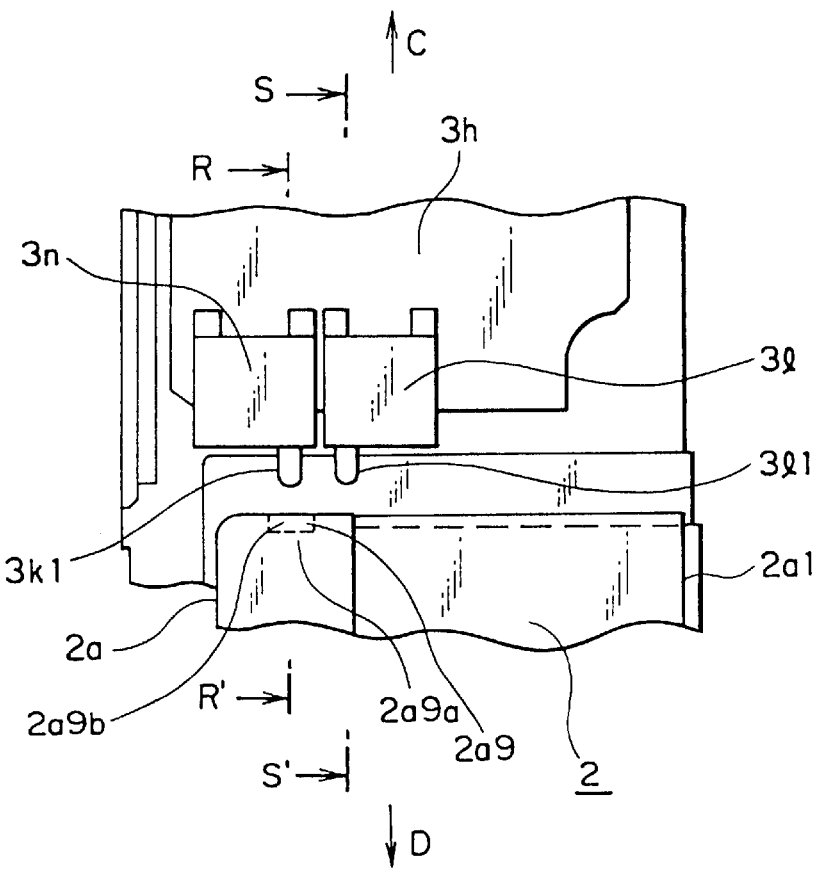
FIG. 14(a) is a view similar to FIG. 8(a), but showing a write-protect detector and a recording medium detector disposed in opposition to each other according to a further embodiment of the invention.
Figures 14B, 14C:
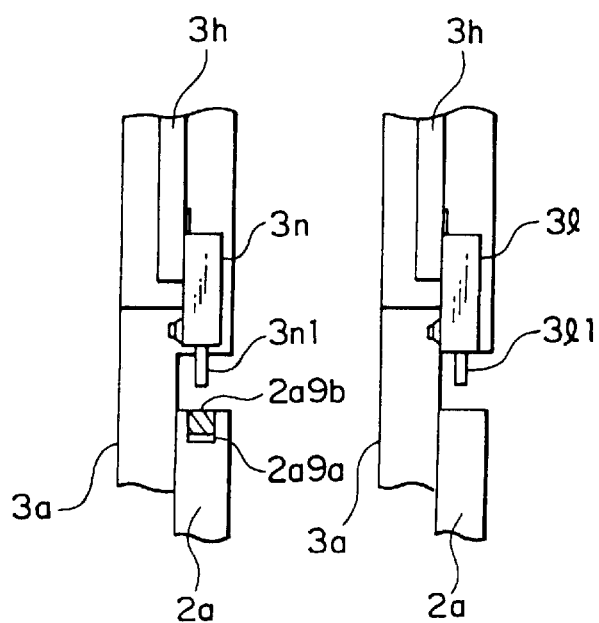
FIG. 14(b) is a cross-sectional view taken along line RR' of FIG. 14(a)
FIG. 14(c) is a crosssectional view taken along line SS' of FIG. 14(a)
Figure 15:
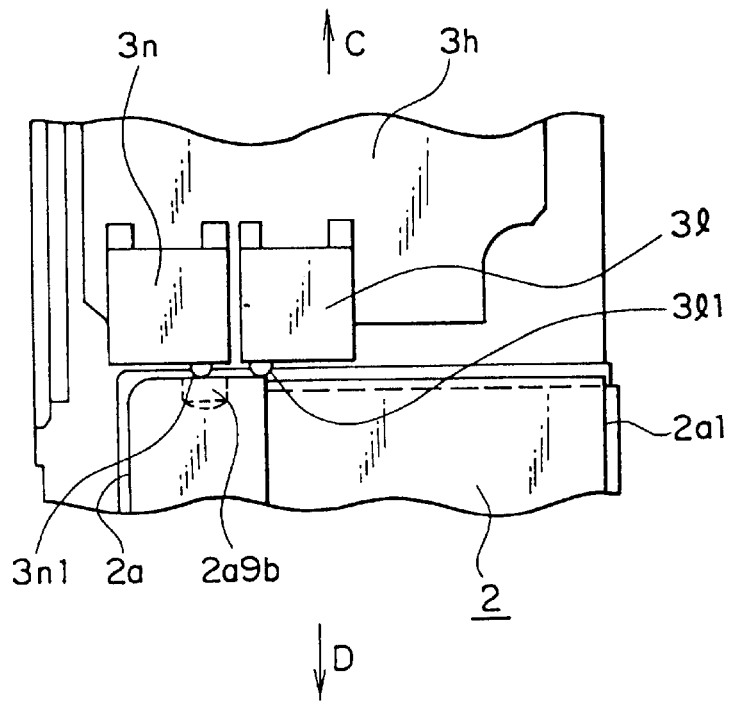
FIG. 15 is a view showing an operating state of the write-protect detector and the recording medium detector of FIG. 14.
Figure 16:
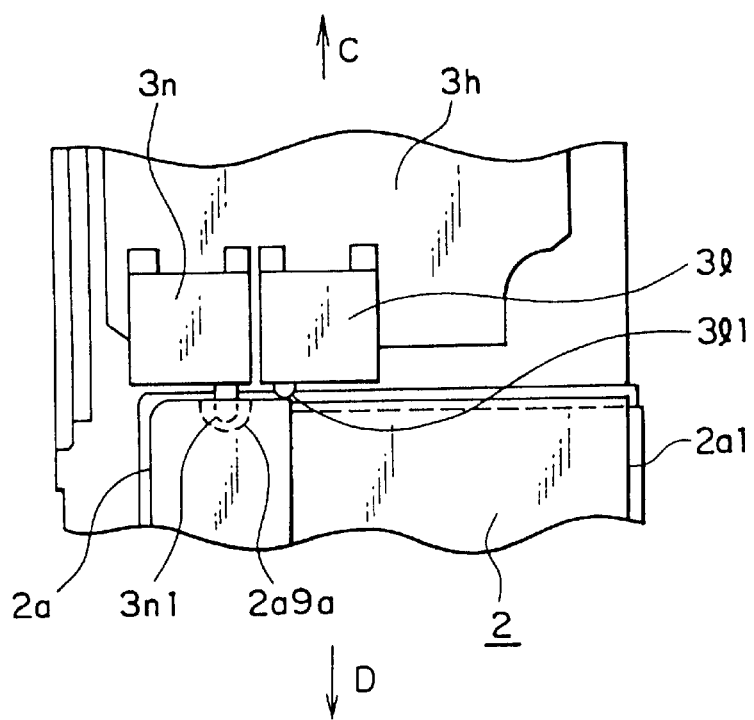
FIG. 16 is a view showing another operating state of the write-protect detector and the recording medium detector of FIG. 14.

FIGS. 14(a) through 14(c), 15 and 16 show a flexible recording system according to a third embodiment of the present invention. FIG. 14(a) shows a relationship between a write-protect detector and a recording medium detector in which they are disposed in opposition with each other; FIG. 14(b) is a cross-sectional view taken along line RR' of FIG. 14(a); and FIG. 14(c) is a cross-sectional view taken along line SS' of FIG. 14(a); FIG. 15 shows an operating state of the write-protect detector and the recording medium detector; and FIG. 16 shows another operating state of the write-protect detector and the recording medium detector. In these figures, like or corresponding parts are identified by the same symbols as in FIGS. 1 through 13.

A write-protect detector 3n is provided on a loading direction C side end of a disk mounting member 3a1 for detecting whether recording and erasing of information into and from the recording medium 2b are possible, A first detection pin 3n1 is provided on the write-protect detector 3n for movement along the loading direction C or the unloading direction D, and is biased toward the unloading direction D by means of an unillustrated spring. The write-protect detector 3n is substantially similar to the write-protect detector 3k of FIG. 8 except for the different positions of the first detection pins 3n1, 3k1.

A recording medium detector 31 is disposed such that a second detection pin 3l1 provided thereon is adapted to be pushed down by an end face of a recording medium cartridge 2a.

Now, the operation of this embodiment will be described with reference to FIGS. 14(a) through 14(c), 15 and 16. First, in a state where a recording disk 2 has not yet been inserted to reach the loading direction C side end of the disk mounting member 3a1, as shown in FIGS. 14(a) through 14(c), the first detection pin 3n1 of the write-protect detector 3n and the second detection pin 3l1 of the recording medium detector 31 are both projected toward the unloading direction D.

Subsequently, when the recording disk 2 has further been inserted to reach the loading direction C side end of the disk mounting member 3a1, as shown in FIG. 15, the first detection pin 3n1 is urged to move toward the loading direction C by means of a spacer 2a9b fitted in an aperture 2a9a so that the first detection pin 3n1 comes in contact with two terminals (not shown) provided in the write-protect detector 3n to establish electrical connection or conduction therebetween. As a result, the write-protect detector 3n detects such electrical conduction and hence push-down at the first detection pin 3n1 and generates to a controller 3h a first detection signal indicative of permission of writing into the recording medium 2b. In this regard, note that in the third embodiment, permission of writing is defined as a condition that the spacer 2a9b is fitted in the aperture 2a9a, and the first detection pin 3n1 is pushed down by the spacer 2a9b.

Also, upon the recording disk 2 having been inserted to the loading direction C side end of the disk mounting portion 3a1, the second detection pin 3l1 is pushed to move toward the loading direction C by means of the peripheral end of the recording medium cartridge 2a of the recording disk 2, so the recording medium detector 31 detects such a movement of the second detection pin 3l1 and generates to the controller 3h a second detection signal indicative of loading or mounting of the recording disk 2.

In addition, as shown in FIG. 16, with the spacer 2a9b being not fitted in the aperture 2a9a, the first detection pin 3n1 is not pushed and remains projected, so the write-protect detector 3n generates no detection signal to the controller 3h. Thus, the controller 3h does not make the magnetic head 3e record information into the recording medium 2b and/or erase the information recorded therein.

Although in the third embodiment te write-protect detector 3n and the recording medium detector 31 are formed separately from each other, they may instead be combined or integrated into each other.

Figure 17:
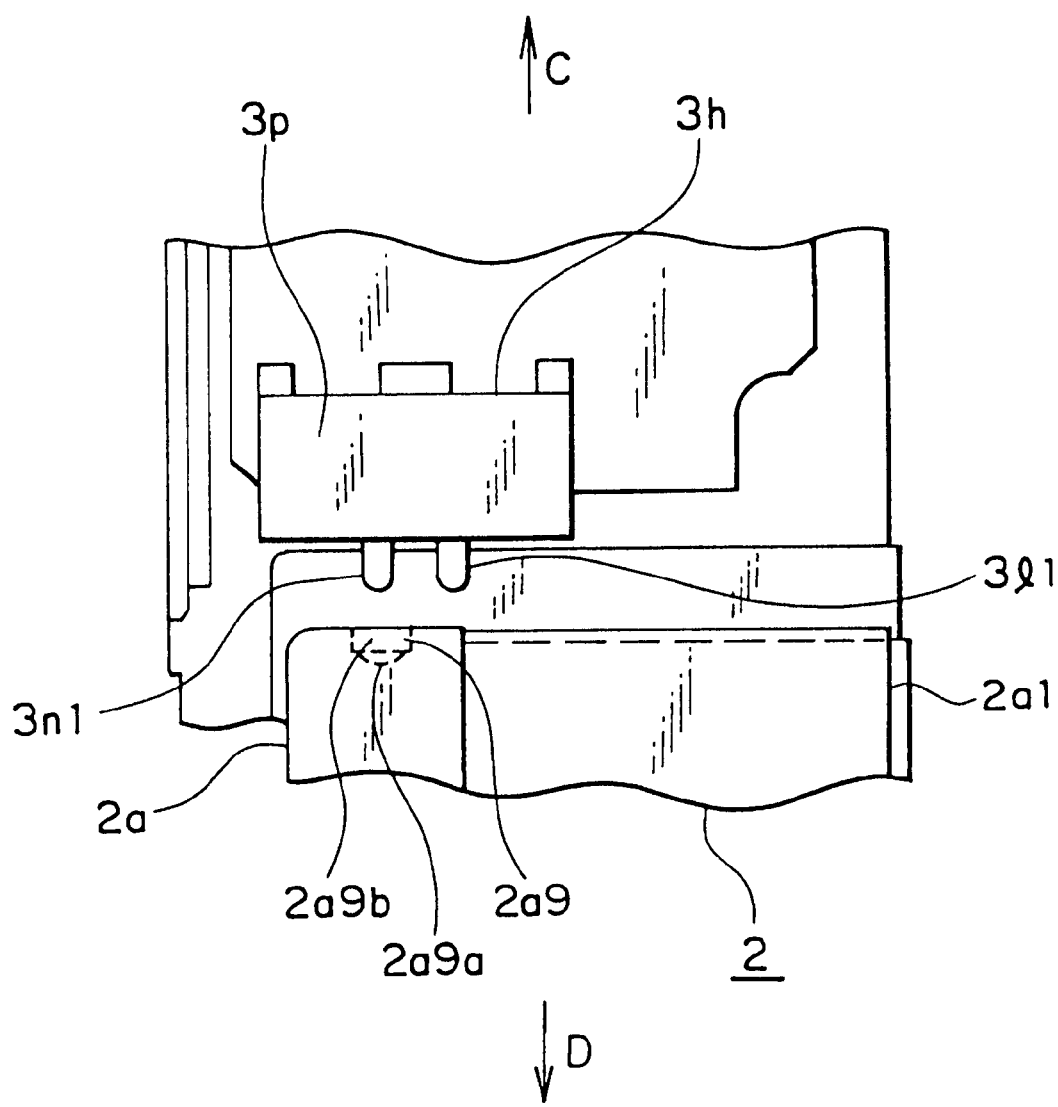
FIG. 17 is a view similar to FIG. 8(a), but showing modifications of a write-protect detector and a recording medium detector according to the present invention.

FIG. 17 shows a modified form of the write-protect detector 3n and the recording medium detector 31 according to the invention. In this figure, like or corresponding parts are identified by the same symbols as in FIGS. 14(a) through 16. In FIG. 17, a detector 3p is provided on the loading direction C side end of the disk mounting portion 3a1 for detecting whether recording and erasing of information into or from the recording medium 2b are possible, and at the same time, whether the recording medium 2b is present or absent. The detector 3p is constructed such that the write-protect detector 3n and the recording medium detector 31 of FIGS. 14(a) through 14(c) are formed integrally with each other and incorporated into a single housing.

According to this embodiment, such an integral construction of the write-protect detector 3n and the recording medium detector 31 can reduce the number of parts or components required and simplify the assembling work.

According to the write-protect detector 3n and the recording medium detector 31 of the third embodiment, there can be obtained substantially the same advantages as with the write-protect detector 3k and the recording medium detector 31 of FIG. 8, in addition to which the second detection pin 3l1, being urged to the peripheral end of the recording medium cartridge 2a, makes it possible to detect the presence and absence of the recording disk 2 in a more reliable manner.

What is claimed is:

1. A flexible recording system comprising:
a recording disk having a disk-shaped recording medium and a recording medium cartridge rotatably housing said recording medium therein; and
a flexible disk drive comprising:
a recording medium drive motor driving rotation of said recording medium around a rotation axis; wherein
said recording disk further has a hub to which said recording medium is fixedly secured, said hub being movable in an axial direction perpendicular to a bottom surface of said recording medium cartridge, said bottom surface defining a bottom plane of said recording medium cartridge that is orthogonal to said rotation axis,
said recording medium cartridge has an opening in said bottom surface through which a surface of said hub protrudes outwardly from said recording medium cartridge upon downward movement of said recording medium in said axial direction, and
said recording medium drive motor has an element that attracts said hub of said recording disk, said recording medium drive motor rotating said recording medium while holding said surface of said hub outwardly from said opening of said recording medium cartridge and below said bottom plane such that a non-cross-sectional, side view of said recording medium cartridge during rotation of said recording medium by said drive motor reveals at least a portion of said hub as being exposed from said recording medium cartridge.

2. The flexible recording system according to claim 1, wherein said recording medium drive motor has a cylindrical rotation shaft of a predetermined length along an axial direction thereof movable therealong and adapted to be displaced toward said recording disk to engage into an axial hole in said hub.

3. The flexible recording system according to claim 2, wherein said rotation shaft of said recording medium drive motor is urged toward said recording disk by means of a spring.

4. The flexible recording system according to claim 2, wherein said recording medium drive motor has a drive pin disposed radially of said rotation shaft for movement therealong and adapted to engage said hub for driving said recording medium to rotate.

5. The flexible recording system according to claim 4, wherein said rotation shaft and said drive pin of said recording medium drive motor are urged toward said recording disk by one and the same spring.

6. The flexible recording system according to claim 1, wherein
said hub has a first angular engagement portion having a center thereof on a center line passing through a center of said recording medium, and a reception chamber formed between said first engagement portion and said surface of said hub,
and said recording disk has a position adjusting member which is received in said reception chamber and which has a second engagement portion engageable with a rotation shaft of said recording medium drive motor and a third engagement portion engageable with said first engagement portion so as to position the center thereof on an axis of rotation of said recording medium,
said position adjusting member being held at a predetermined position of said rotation shaft through engagement of said second engagement portion with said rotation shaft and positioning the center of said first engagement portion on said axis of rotation through said third engagement portion.

7. The flexible recording system according to claim 1, wherein a rotation shaft of said recording medium drive motor has a chamfered portion formed at one end thereof near said recording disk, and said recording disk includes a position adjusting member having an engagement portion shaped in a configuration to match said chamfered portion of said rotation shaft, said position adjusting member being disposed in a chamber formed in said hub.

8. The flexible recording system according to claim 1, wherein said element that attracts said hub of said recording disk is a chucking magnet.

9. A flexible disk drive comprising:

a recording medium drive motor driving rotation of a recording medium, housed in a recording medium cartridge, around a rotation axis, said recording medium being movable in an axial direction perpendicular to a bottom surface of said recording medium cartridge, said bottom surface defining a bottom plane of said recording medium cartridge that is orthogonal to said rotation axis;

wherein said recording medium drive motor has an element that attracts a hub of said recording medium outward from said recording medium cartridge upon downward movement of said recording medium in said axial direction, said recording medium drive motor rotating said recording medium while holding a surface of said hub outwardly from said recording medium cartridge and below said bottom plane such that a non-cross-sectional, side view of said recording medium cartridge during rotation of said recording medium by said drive motor reveals at least a portion of said hub as being exposed from said recording medium cartridge.

10. The flexible disk drive according to claim 9, wherein said recording medium drive motor includes a rotation shaft that is urged toward said recording medium by a spring.

11. The flexible disk drive according to claim 10, wherein said recording medium drive motor has a drive pin disposed radially of said rotation shaft for movement therealong and adapted to engage said hub for driving said recording medium to rotate.

12. The flexible disk drive according to claim 11, wherein said rotation shaft and said drive pin of said recording medium drive motor are urged toward said recording disk by one and the same spring.

13. The flexible disk drive according to claim 9, wherein said element that attracts said hub of said recording medium is a chucking magnet.

14. A recording disk comprising:

a disk-shaped recording medium;

a recording medium cartridge rotatably housing said recording medium therein; and a hub to which said recording medium is fixedly secured, said hub being movable in an axial direction perpendicular to a bottom surface of said recording medium cartridge, said bottom surface defining a bottom plane of said recording medium cartridge that is orthogonal to a rotation axis of said recording medium, wherein said recording medium cartridge has an opening through which a surface of said hub protrudes outward from said recording medium cartridge and below said bottom plane during drive of said hub by a recording medium drive after downward movement of said recording medium in said axial direction such that a non-cross-sectional, side view of said recording medium cartridge during rotation of said recording medium by said drive reveals at least a portion of said hub as being exposed from said recording medium cartridge.

15. The recording disk according to claim 14, further comprising a position adjusting member disposed in a chamber formed in said hub, said position adjusting member engaging with a rotation shaft of said recording medium drive for adjusting the position of said recording medium such that an axis of rotation of said recording medium rotated by said recording medium drive substantially coincides with the center of said recording medium.

16. The recording disk according to claim 15, wherein said hub has a first annular engagement portion having a center thereof on a center line passing through a center of said recording medium, and a reception chamber formed between said first engagement portion and said surface of said hub, and said position adjusting member is received in said reception chamber and has a second engagement portion engageable with a rotation shaft of said recording medium drive and a third engagement portion engageable with said first engagement portion so as to position the center thereof on an axis of rotation of said recording medium, said position adjusting member being held at a predetermined position of said rotation shaft through engagement of said second engagement portion with said rotation shaft and positioning the center of said first engagement portion on said axis of rotation through said third engagement portion.

17. The recording disk according to claim 16, wherein said first engagement portion of said hub and said third engagement portion of said position adjusting member have substantially the same diameter, and said first engagement portion or said second engagement portion is of a cone-shaped configuration.

18. The recording disk of claim 14, wherein said disk is for use in recording and/or reproducing data when interacting with said recording medium drive imparting rotation to said recording medium.

19. The recording disk of claim 18, wherein said recording medium drive is provided with a disk drive spindle which interacts with said disk.

20. A recording disk for use in recording and/or reproducing data when interacting with a recording medium drive imparting rotation to a medium, said recording disk comprising:

a disk-shaped recording medium rotatable about a central axis and having a recording medium thickness in the direction of the central axis;

a recording medium cartridge having a cavity for housing said recording medium therein, said cavity having a width spacing defined in the direction of the central axis greater than the recording medium thickness to allow rotation of said medium when said medium is operationally positioned within said cavity, providing sufficient rotational clearance with said cartridge; and a hub to which said recording medium is fixedly secured, said hub being movable in the direction of said central axis, wherein said recording medium cartridge has an opening in a bottom surface thereof, said bottom surface defining a bottom plane of said recording medium cartridge that is orthogonal to said central axis, a surface of said hub protruding outward from said recording medium cartridge and below said bottom plane when said medium is located to provide sufficient rotational clearance with said cartridge after downward movement of said recording medium in said direction of said central axis such that a non-cross-sectional, side view of said recording medium cartridge during rotation of said recording medium by said drive reveals at least a portion of said hub as being exposed from said recording medium cartridge.

21. The recording disk of claim 20, wherein said recording medium is relatively centrally positioned within the cavity of said cartridge in the width dimension.

22. The recording disk according to claim 20, further comprising a position adjusting member connected with said hub, wherein said position adjusting member engages with a spindle of said recording medium drive for adjusting the position of said recording medium through said hub such that the central axis of said recording medium substantially coincides with an axis of rotation of said recording medium drive.

* * * * *